US011911919B2

(12) United States Patent
Moreira Rodrigues et al.

(10) Patent No.: US 11,911,919 B2
(45) Date of Patent: Feb. 27, 2024

(54) METHOD AND COMPUTING SYSTEM FOR PERFORMING GRIP REGION DETECTION

(71) Applicant: MUJIN, INC., Tokyo (JP)

(72) Inventors: Jose Jeronimo Moreira Rodrigues, Tokyo (JP); Rosen Nikolaev Diankov, Tokyo (JP); Jinze Yu, Tokyo (JP); Ahmed Abouelela, Tokyo (JP); Yoshiki Kanemoto, Tokyo (JP)

(73) Assignee: MUJIN, INC., Tokyo (JP)

( * ) Notice: Subject to any disclaimer, the term of this patent is extended or adjusted under 35 U.S.C. 154(b) by 189 days.

(21) Appl. No.: 17/193,268

(22) Filed: Mar. 5, 2021

(65) Prior Publication Data

US 2022/0281114 A1 Sep. 8, 2022

(51) Int. Cl.
*B25J 9/16* (2006.01)

(52) U.S. Cl.
CPC .................................. *B25J 9/1697* (2013.01)

(58) Field of Classification Search
CPC ...................................................... B25J 9/1697
See application file for complete search history.

(56) References Cited

U.S. PATENT DOCUMENTS

| 9,669,543 B1* | 6/2017 | Stubbs ................. B25J 9/1612 |
| 10,399,227 B1 | 9/2019 | Islam et al. |
| 10,579,045 B2 | 3/2020 | Gombert et al. |
| 10,906,188 B1* | 2/2021 | Sun ........................ B25J 9/161 |
| 2007/0213874 A1* | 9/2007 | Oumi .................... B25J 9/1697 700/245 |
| 2014/0008928 A1* | 1/2014 | Collado ............... B25J 15/0061 294/183 |

(Continued)

FOREIGN PATENT DOCUMENTS

| CN | 109483554 A | 3/2019 |
| CN | 110046538 A | 7/2019 |

(Continued)

OTHER PUBLICATIONS

Japanese Office Action dated Jul. 5, 2021 in corresponding JP Patent Application No. 2021-078864.

(Continued)

*Primary Examiner* — Jeff A Burke
*Assistant Examiner* — Arslan Azhar
(74) *Attorney, Agent, or Firm* — MEDLER FERRO WOODHOUSE & MILLS PLLC

(57) ABSTRACT

A method performed by a computing system is presented. The method may include the computing system receiving image information that represents an object surface associated with a flexible object, and identifying, as a grip region, a surface region of the object surface that satisfies a defined smoothness condition and has a region size that is larger than or equal to a defined region size threshold, wherein the grip region is identified based on the image information. The method may further include identifying, as a safety region, a three-dimensional (3D) region which surrounds the grip region in one or more horizontal dimensions, and which extends from the grip region along a vertical dimension that is perpendicular to the one or more horizontal dimensions. The method may further include performing robot motion planning based on the grip region and the safety region.

20 Claims, 30 Drawing Sheets

(56) References Cited

U.S. PATENT DOCUMENTS

2019/0184554 A1    6/2019  Yamazaki et al.
2019/0390396 A1*  12/2019  Kwak .................. B25J 5/02
2020/0316782 A1*  10/2020  Chavez ................ G06T 7/12
2020/0368923 A1  11/2020  Tsukui

FOREIGN PATENT DOCUMENTS

| CN | 209755189 U | 12/2019 |
| CN | 111275063 A | 6/2020 |
| JP | 6622207 B2 | 11/2019 |
| JP | 6688517 B1 | 4/2020 |

OTHER PUBLICATIONS

CN Office Action dated Feb. 11, 2022 in corresponding Chinese Patent Applicaton No. 202110775316.8.

* cited by examiner

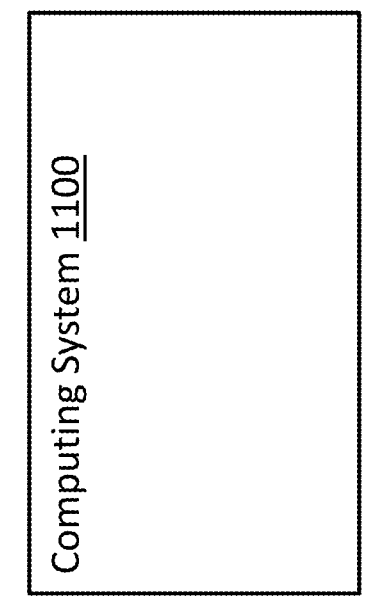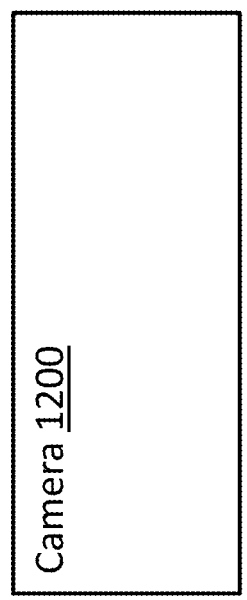
FIG. 1A

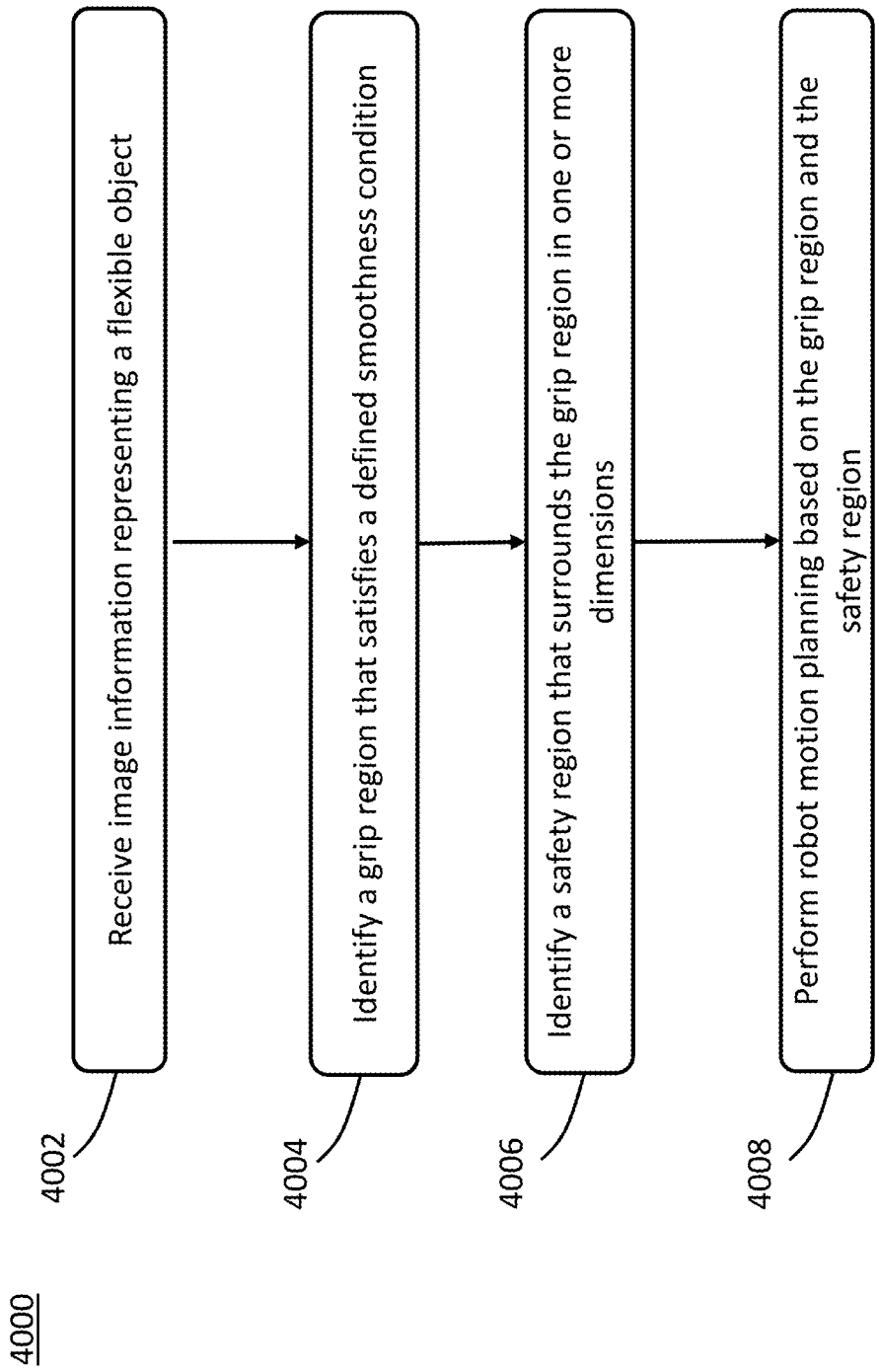

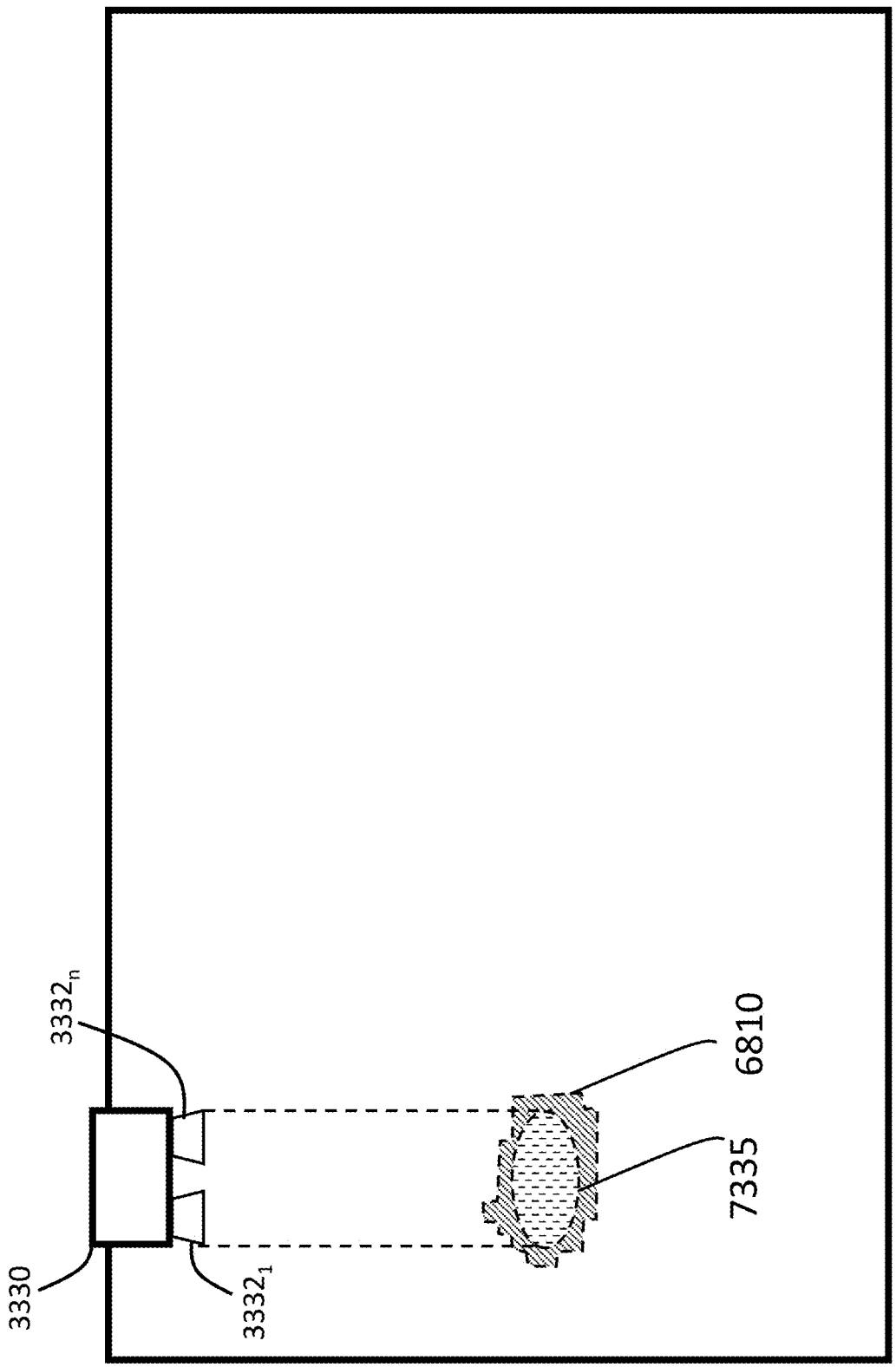

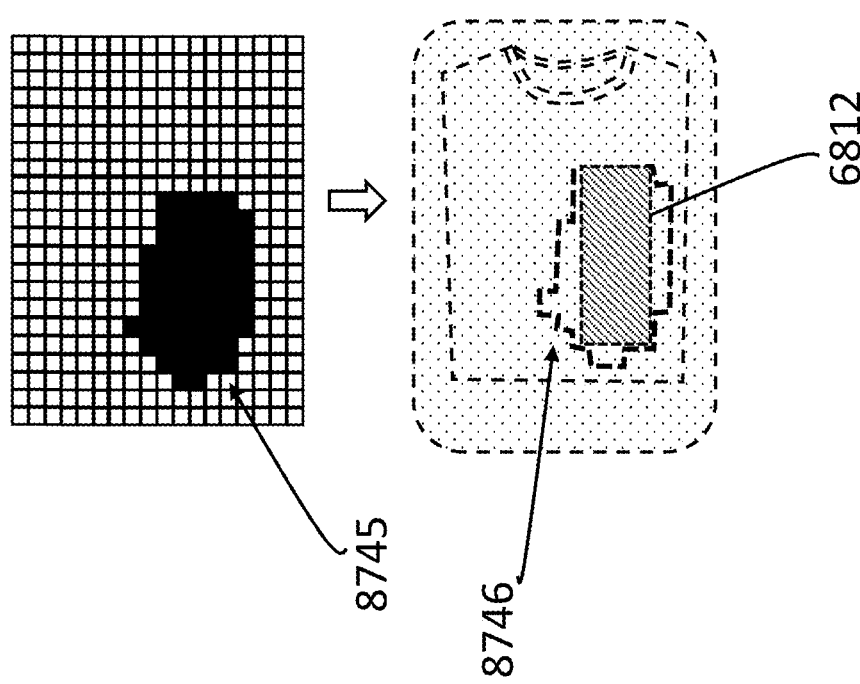

METHOD AND COMPUTING SYSTEM FOR PERFORMING GRIP REGION DETECTION

FIELD OF THE INVENTION

The present disclosure is related to computing systems and methods for performing grip region detection, such as for a flexible object.

BACKGROUND OF THE INVENTION

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

SUMMARY

One aspect of the present disclosure relates to a computing system, a method, and a non-transitory computer-readable medium having instructions which may be executed by the computing system to perform the method. The system may include a communication interface and at least one processing circuit. The communication interface is configured to communicate with a robot having an end effector apparatus, and with a camera having a camera field of view. The at least one processing circuit is configured, when a flexible object is in the camera field of view, to perform the method. The method may include receiving image information that represents an object surface associated with the flexible object, wherein the image information is generated by the camera. The method may further include identifying, as a grip region, a surface region of the object surface that satisfies a defined smoothness condition and has a region size that is larger than or equal to a defined region size threshold, wherein the grip region is identified based on the image information. The method may further include identifying, as a safety region, a three-dimensional (3D) region which surrounds the grip region in one or more horizontal dimensions, and which extends from the grip region along a vertical dimension that is perpendicular to the one or more horizontal dimensions. The method may further include performing robot motion planning based on the grip region and the safety region, wherein the robot motion planning is for gripping of the flexible object at the grip region by the end effector apparatus.

BRIEF DESCRIPTION OF THE FIGURES

FIGS. 1A-1D illustrate a system for performing grip region detection, consistent with embodiments hereof.

FIG. 4 provides a flow diagram that illustrates a method of identifying a grip region and a safety region, according to an embodiment hereof.

FIGS. 7A and 7B illustrate a surface region which may be identified as a grip region, according to an embodiment hereof.

FIGS. 9A and 9B illustrate various aspects of identifying a grip region, according to an embodiment hereof.

DETAILED DESCRIPTION OF THE FIGURES

Figure 1B:
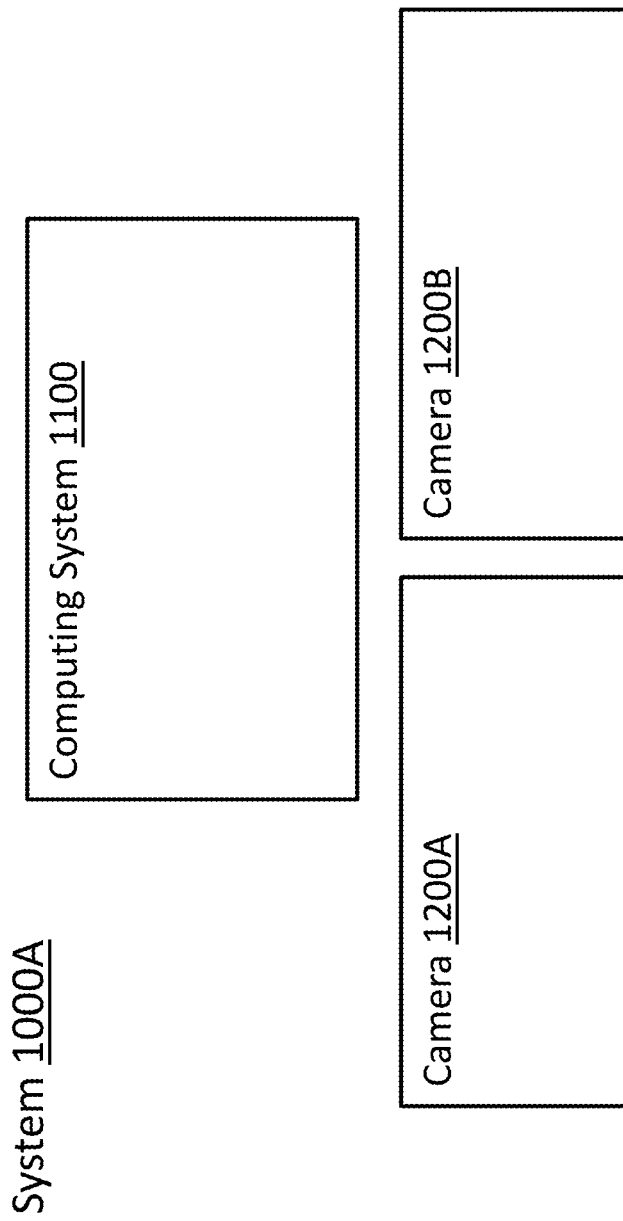

One aspect of the present disclosure relates to identifying a grip region and/or a safety region for gripping an object. The grip region, which may also be referred to as a pickable region, may be used to facilitate a robot picking up or otherwise gripping the object. The safety region, which may also be referred to as a safety volume, may be used to determine a trajectory for the object which has a reduced risk of collision. In one example, the object may be a package in a warehouse or retail space, and the grip region and/or safety region may be identified so as to facilitate a process of controlling the robot to grip the object and move the object to a destination location.

In an embodiment, identifying a grip region for picking up an object may involve identifying, as the grip region, a sufficiently smooth and sufficiently large surface region on the object's surface. The grip region may be a surface region which is identified from image information generated by a camera, wherein the image information may represent a scene that includes the object to be gripped. The surface region in this embodiment may provide a suitable candidate region for an end effector apparatus of the robot to engage and grip. In some instances, the robot may include an end effector apparatus which has, e.g., one or more suction cups that are configured to be pressed against or otherwise make contact with an object's surface. The one or more suction cups may be able to create adhesion with the object's surface if there is sufficient contact between the object's surface and the one or more suction cups. In some instances, the object to be gripped may be a flexible object, such as a package of clothing. More specifically, the package may include a piece of clothing wrapped in a sheet of plastic or other packaging material. Such a flexible object may be sufficiently soft or otherwise deformable, which may allow one or more portions of the flexible object to temporarily form one or more non-smooth portions as a result of how the flexible object is physically arranged in its environment. The non-smooth portions may include, e.g., bumps, wrinkles, ridges, depressions, or other physical features which introduce non-smoothness to respective local portions of the flexible object's surface. A non-smooth portion of the object's surface may reduce an amount of possible contact between an end effector apparatus and that portion of the object's surface, which may interfere with an ability of the end effector apparatus to create adhesion between itself and that portion of the object's surface. Thus, a computing system of the embodiments herein may attempt to identify a sufficiently smooth surface region as the grip region, so that the end effector apparatus is able to more reliably create adhesion between itself and the grip region. The identified grip region may be larger than a defined region size threshold, so as to be large enough to fit a component of the end effector apparatus (e.g., suction cup) used to makes contact with the object's surface.

In an embodiment, a computing system may attempt to find a sufficiently smooth surface region by searching for a surface region that satisfies a defined smoothness condition. Such a condition may involve portions of the surface region having sufficiently similar orientation and sufficiently similar depth. For example, the computing system may divide one or more object surfaces into a plurality of two-dimensional (2D) patches, also referred to as 2D planes, and search for contiguous 2D patches which satisfy a defined orientation similarity criterion and/or a defined depth similarity criterion, as discussed below in more detail.

In an embodiment, the computing system may attempt to identify a grip region as a surface region which is formed by or fits within a set of contiguous 2D patches that satisfy the defined smoothness condition. In some implementations, the computing system may identify a 2D patch which represents a smoothest location or cluster of locations in a scene represented by the image information generated by the camera. The computing system may use the 2D patch as a seed, or initial 2D patch, and may attempt to expand the initial 2D patch into the set of contiguous 2D patches. The expansion operation may involve searching for additional 2D patches which define a local region that includes the initial 2D patch and satisfies the defined smoothness condition. In some instances, the computing system may search for a largest local region that can be formed from such an expansion operation while still satisfying the defined smoothness condition. In some implementations, the grip region may be such a local region formed by the set of contiguous 2D patches. In some implementations, the grip region may be a smaller region that fits within such a local region.

In an embodiment, the computing system may determine, as a safety region, a three-dimensional (3D) region that surrounds the grip region in one or more horizontal dimensions. In some instances, the safety region may surround the grip region in a vertical dimension. The safety region may define a safety margin around the grip region, which may be taken into account by a motion planning operation so as to reduce a risk of collision between an object being gripped by a robot and other objects or structures in the robot's environment. In some instances, the safety region may be sufficiently large so that, when the safety region surrounds the safety region in one or more horizontal dimensions, it is also likely to surround an object associated with the grip region. For instance, the safety region may have an edge which is determined based on a defined lateral dimension size associated with an object or a group of objects having the same size, or based on a maximum lateral dimension size associated with a group of objects having different sizes.

In an embodiment, a computing system may determine the safety region to have a height which is based on an object's lateral dimension size. In such an embodiment, the object may be a flexible object that is sufficiently soft so as to sag under its own weight when the object is lifted by a robot. In such an embodiment, the height of the safety region may account for the sagging of the flexible object, which may be used by motion planning to reduce a risk of collision between a sagging portion of the flexible object and other structures or objects in the robot's environment.

FIG. 1A illustrates a system 1000 for performing grip region detection, or more specifically generating a detection result which identifies a grip region, based on image information. More particularly, the system 1000 may include a computing system 1100 and a camera 1200. In this example, the camera 1200 may be configured to generate image information which describes or otherwise represents an environment in which the camera 1200 is located, or more specifically represents an environment in the camera 1200's field of view (also referred to as a camera field of view). The environment may be, e.g., a warehouse, a retail space, or some other premises. In such instances, the image information may represent objects, such as packages of clothing or other flexible objects, being stored and/or handled at such premises. The system 1000 may be configured to generate, receive, and/or process the image information, such as by performing robot motion planning based on the image information, as discussed below in more detail. The robot motion planning may be used to, e.g., control a robot at the premises to facilitate robot interaction between the robot and the objects, such as a robot interaction in which the robot picks up or otherwise grips one of the objects from an original location and moves the object to a destination location. The computing system 1100 and the camera 1200 may be located at the same premises, or may be located remotely from each other. For instance, the computing system 1100 may be part of a cloud computing platform hosted in a data center which is remote from the warehouse or retail space, and may be communicating with the camera 1200 via a network connection.

In an embodiment, the camera 1200 may be a 2D camera and/or a 3D camera (the terms "and/or" and "or" are used interchangeably in this disclosure). For example, FIG. 1B illustrates a system 1000A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information which describes respective depth values of various locations relative to the camera 1200B, such as locations on surfaces of various objects in the camera 1200's field of view. The depth information in this example may be used to estimate how the objects are spatially arranged in three-dimensional (3D) space. In some instances, the spatial structure information may include or may be used to generate a depth map or point cloud that describes locations on one or more objects' surfaces (also referred to as one or more object surfaces) in the camera 1200B's field of view. In some instances, the spatial structure information may describe various locations on a structure of the object (also referred to as an object structure).

Figure 1C:
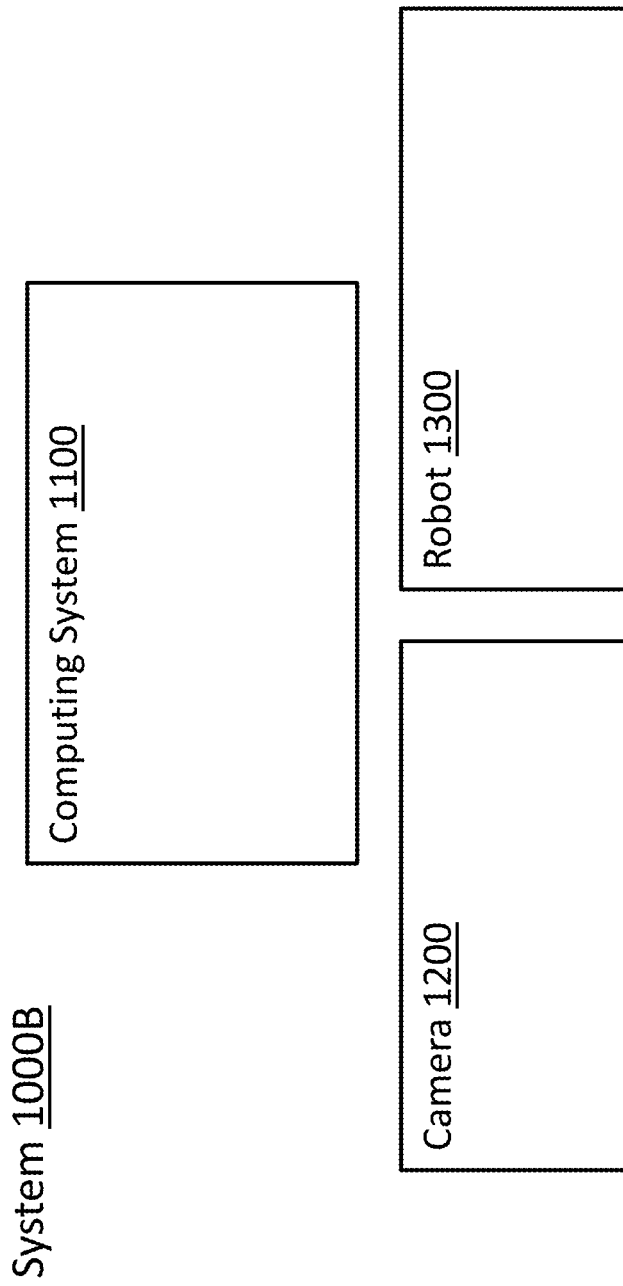

In an embodiment, the system 1000 may be a robot operation system for facilitating interaction between a robot and various objects in the environment of the camera 1200. For example, FIG. 1C illustrates a robot operation system 1000B, which may be an embodiment of the system 1000/1000A of FIGS. 1A and 1B. The robot operation system 1000B may include the computing system 1100, the camera 1200, and a robot 1300. As stated above, the robot 1300 may be used to interact with one or more objects in the environment of the camera 1200, such as with packages of clothing disposed within bins. For example, the robot 1300 may be configured to pick up or otherwise grip a package having a piece of clothing, lift the package upwards from the bin, and move the package to another location, such as a location on a conveyor belt. In some implementations, the camera 1200 may be attached to the robot 1300, such as to a robot arm of the robot 1300. Such implementations may allow the camera 1200 to be moved to different locations and/or orientations via the robot arm. In some implementations, the camera 1200 may be separate from the robot 1300. For instance, the camera 1200 may be mounted to a ceiling or other structure within a warehouse, and may remain stationary relative to the structure.

In an embodiment, the computing system 1100 of FIGS. 1A-1C may form or be part of a robot control system (also referred to as a robot controller), which is part of the robot operation system 1000B. The robot control system may be a system that is configured to, e.g., generate movement commands or other commands for the robot 1300. In such an embodiment, the computing system 1100 may be configured to generate such commands based on, e.g., image information generated by the camera 1200/1200A/1200B. For instance, the computing system 1100 may be configured to determine a motion plan based on the image information, and generate one or more movement commands to execute the motion plan. The motion plan may be, e.g., a robot motion plan, which may be a plan for the robot to execute to move one or more objects. For example, the motion plan may involve an end effector apparatus of the robot 1300 approaching the object, then picking up or otherwise gripping the object (e.g., via a suction cup or other component of the end effector apparatus), and moving the object to a destination location.

In an embodiment, the computing system 1100 may form or be part of a vision system. The vision system may be a system which generates, e.g., vision information which describes an environment in which the robot 1300 is located, or more specifically describes an environment in which the camera 1200 is located. The vision information may include the 3D image information or the 2D image information discussed above, or some other image information. In some scenarios, if the computing system 1100 forms a vision system, the vision system may be part of the robot control system discussed above, or may be separate from the robot control system. If the vision system is separate from the robot control system, the vision system may be configured to output information describing the environment in which the robot 1300 is located. The information may be outputted to the robot control system, which may receive such information from the vision system and control movement of the robot 1300, or more specifically perform robot motion planning, based on the information.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

Figure 1D:
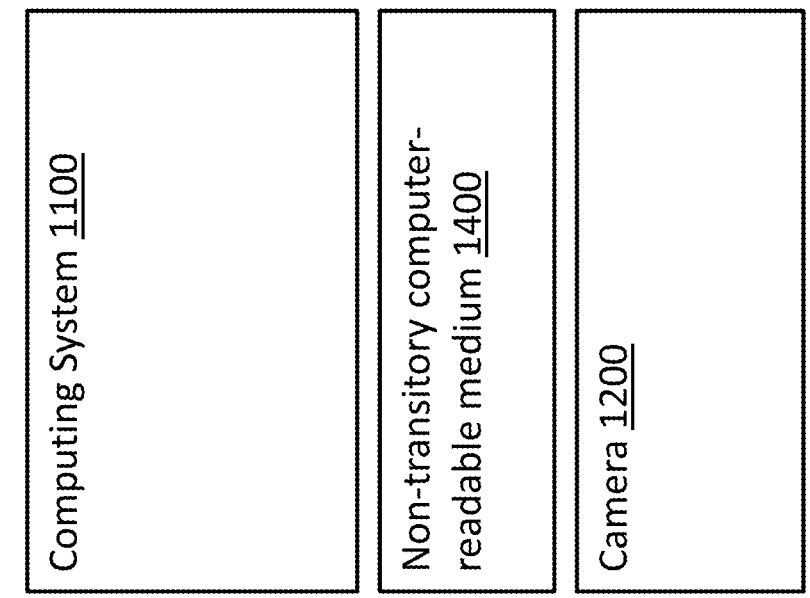

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1000C, which may be an embodiment of the system 1000/1000A/1000B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera, a structured light camera, a stereoscopic camera or camera system (which may include multiple cameras that collectively provide stereoscopic vision), or any other type of 3D camera. In some cases, the 2D camera and/or 3D camera may include an image sensor, such as a charge coupled device (CCD) sensor and/or complementary metal oxide semiconductor (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
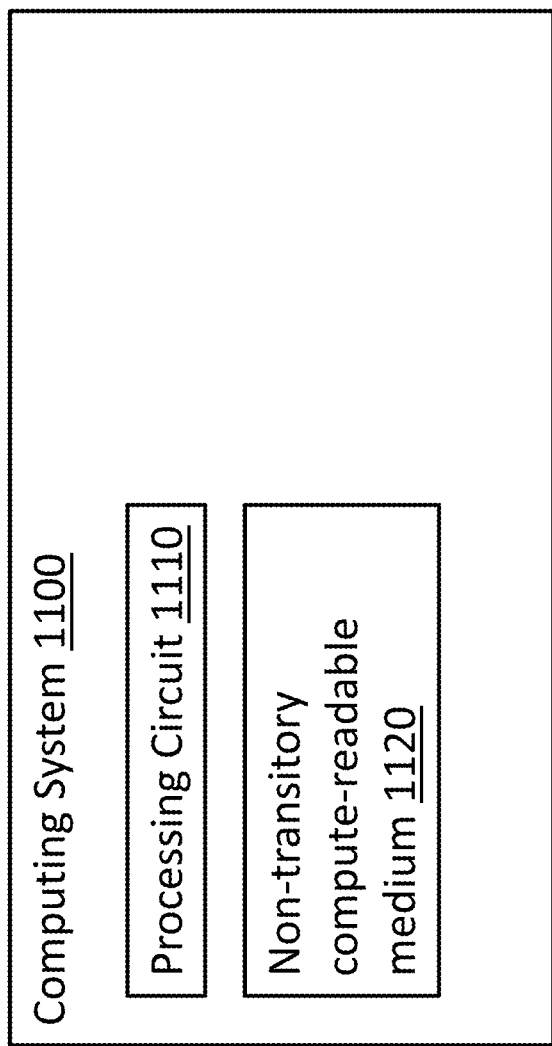
FIGS. 2A-2C provide block diagrams that illustrate a computing system configured to perform grip region detection, consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. The non-transitory computer-readable medium 1120 may alternatively or additionally store computer readable program instructions that, when executed by the processing circuit 1110, causes the processing circuit 1110 to perform one or more methodologies described here, such as the operations described with respect to FIG. 4.

Figure 2B:
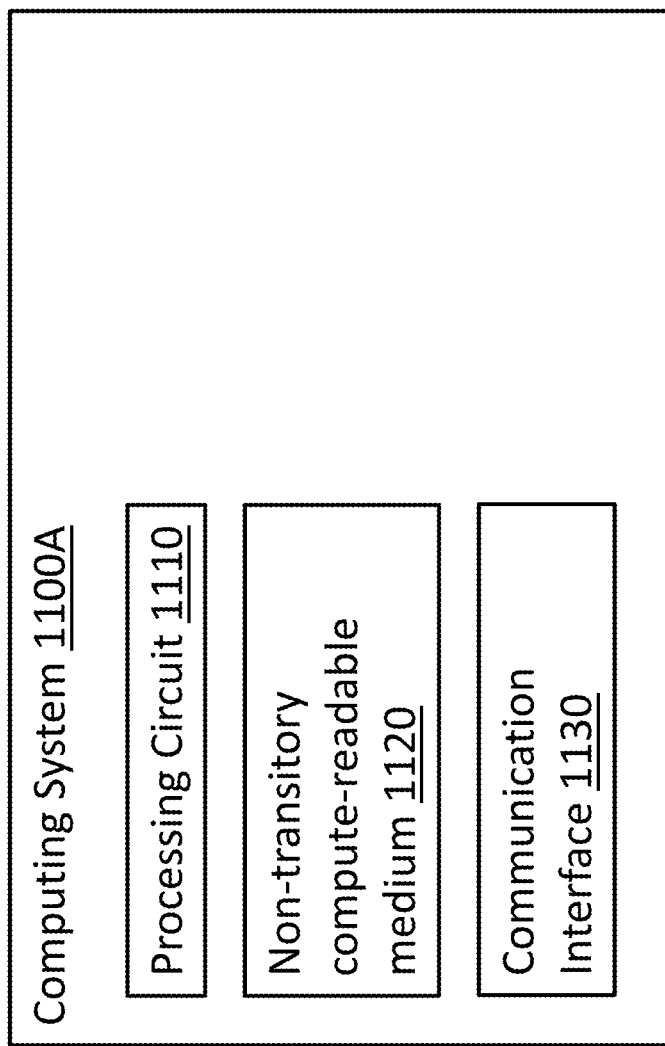

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
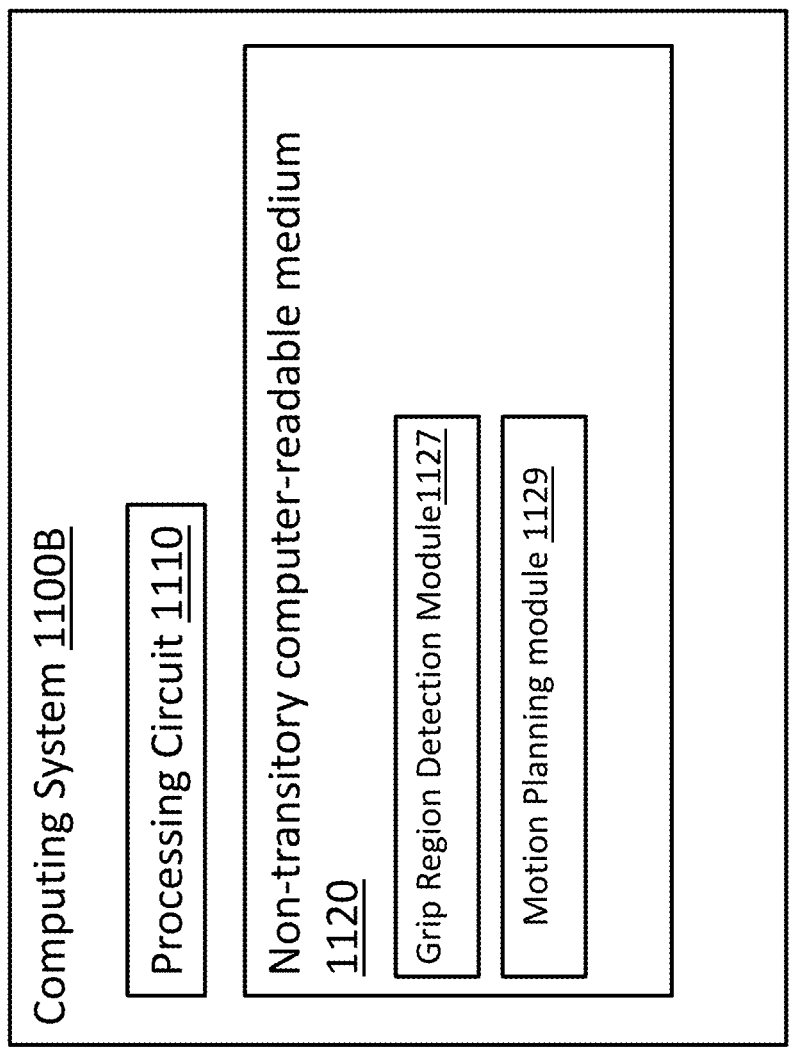

In an embodiment, the processing circuit 1110 may be programmed by one or more computer-readable program instructions stored on the non-transitory computer-readable medium 1120. For example, FIG. 2C illustrates a computing system 1100B, which is an embodiment of the computing system 1100/1100A, in which the processing circuit 1110 is programmed by one or more modules, including a grip region detection module 1127 and/or a motion planning module 1129.

In an embodiment, the grip region detection module 1127 may be configured to perform a grip region detection operation, which may involve performing, e.g., steps 4002 through 4006 of method 4000, which is discussed below in more detail. The grip region detection operation may be used to facilitate the gripping of an object, such as a package having a piece of clothing, by a robot. More particularly, the gripping region detection operation may identify a grip region, which may be a suitable region on the object's surface (also referred to as a suitable surface region) at which the object can be picked up or otherwise gripped by the robot. In some implementations, the grip region detection operation may identify, as the grip region, a surface region on the object's surface that is sufficiently smooth and sufficiently large to reliably enable the robot to grip the object at the surface region. For instance, if the robot uses one or more suction cups to adhere to an object's surface (also referred to as object surface), the grip region (also referred to as a grippable region or pickable region) identified by the module 1127 may be a surface region that is sufficiently smooth and sufficiently large to engage the one or more suction cups and to enable adhesion to be reliably created between the surface region and the one or more suction cups. The module 1127 may determine whether the surface region is sufficiently smooth by, e.g., determining whether the surface region satisfies a defined smoothness condition, which is discussed below in more detail. In an embodiment, the grip region detection module 1127 may be configured to detect a safety region that surrounds the grip region, as discussed below in more detail. In some instances, the grip region detection module 1127 may be configured to analyze or otherwise process image information that represents a scene in a camera field of view, and to identify or generate a grip region and/or the safety region based on the image information. In such instances, the grip region and/or the safety region may be an output of the grip region detection module 1127.

In an embodiment, the motion planning module 1129 may be configured to perform motion planning, or more specifically robot motion planning, based on an output of the grip region detection module 1127, or more generally based on image information which represents a scene in a camera field of view. More particularly, the motion planning may involve determining motion to be performed by a robot (e.g., 1300) or a component thereof. For instance, the motion planning may involve determining a trajectory for the robot 1300, or more specifically an end effector apparatus thereof, to grip an object in the camera field of view and to move the object to a destination location. As an example, the trajectory may cause a suction cup or other component of the end effector apparatus to engage or otherwise make contact with a grip region on the object's surface, wherein the grip region may be identified by the module 1127, so as to grip the object. The trajectory may further cause the end effector apparatus to lift the object and to move the object to a destination location. In some instances, the motion planning module 1129 may determine the trajectory based on the safety region, which may also be identified by the module 1127. The safety region may be used by the module 1129 to reduce a risk of collision between the gripped object and another object or structure in the robot's environment, as discussed below in more detail.

In an embodiment, the non-transitory computer-readable medium 1120 may store information used by the module 1127/1129, and/or an output of the module 1127/1129. For example, if the grip region detection module 1127 uses one or more threshold values, such as a region size threshold, the one or more threshold values may be stored in the non-transitory computer-readable medium 1120. The one or more threshold values may have been dynamically defined by the computing system 1100, or may have been predefined manually, and thus may be referred to as one or more defined thresholds or threshold values.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 3A:
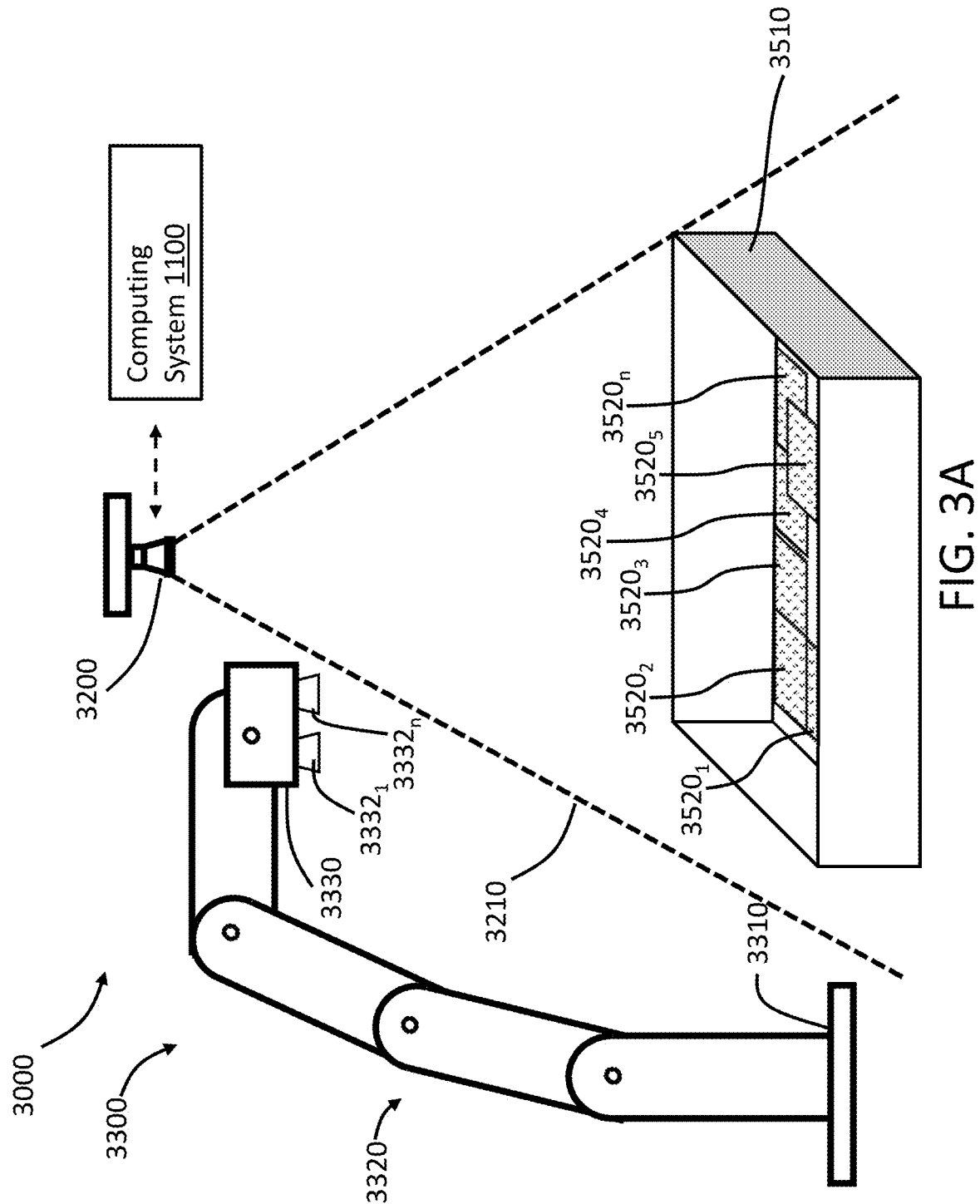
FIGS. 3A-3C illustrate environments in which grip region detection may be performed, according to an embodiment hereof.
Figure 3B:
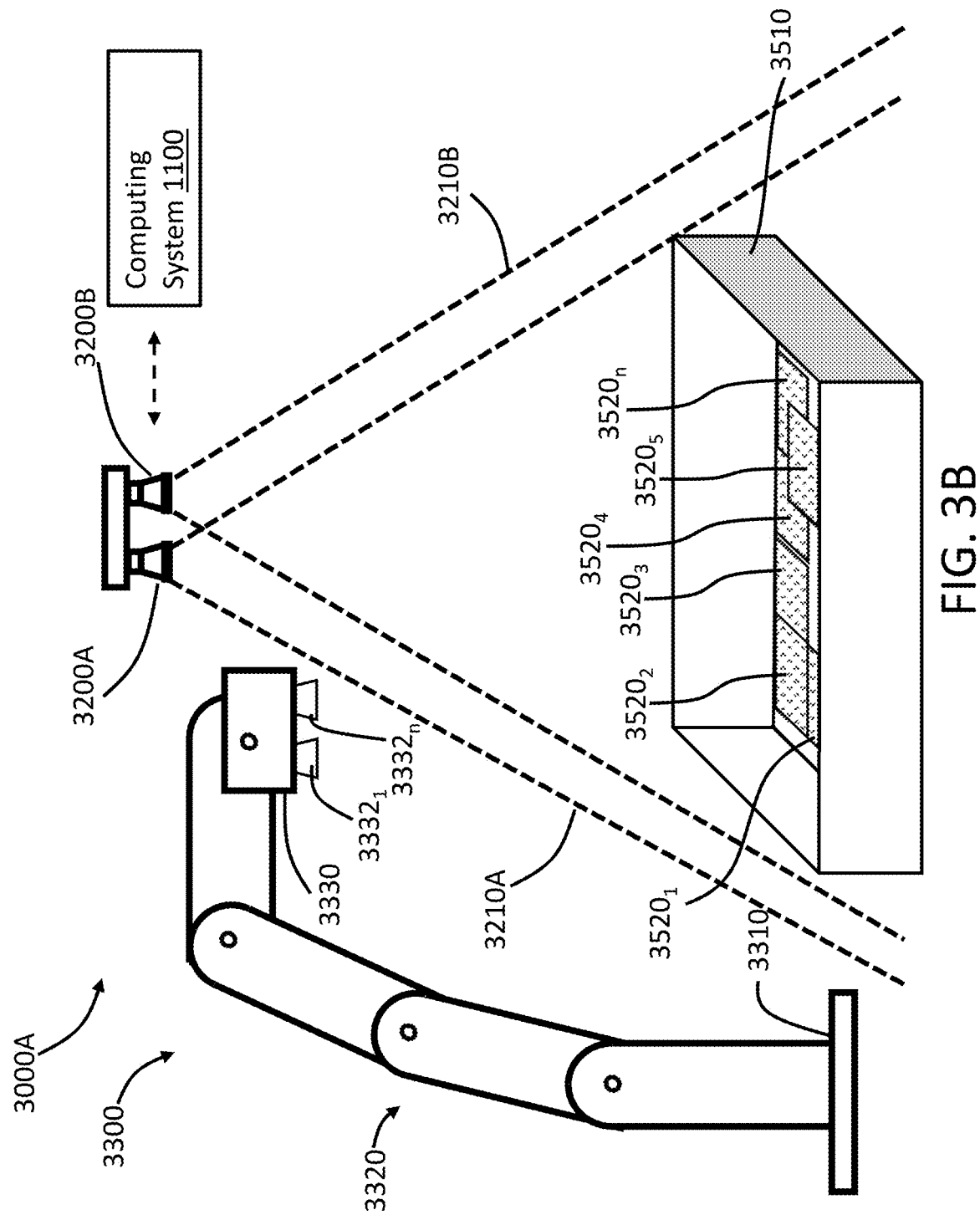
Figure 3C:
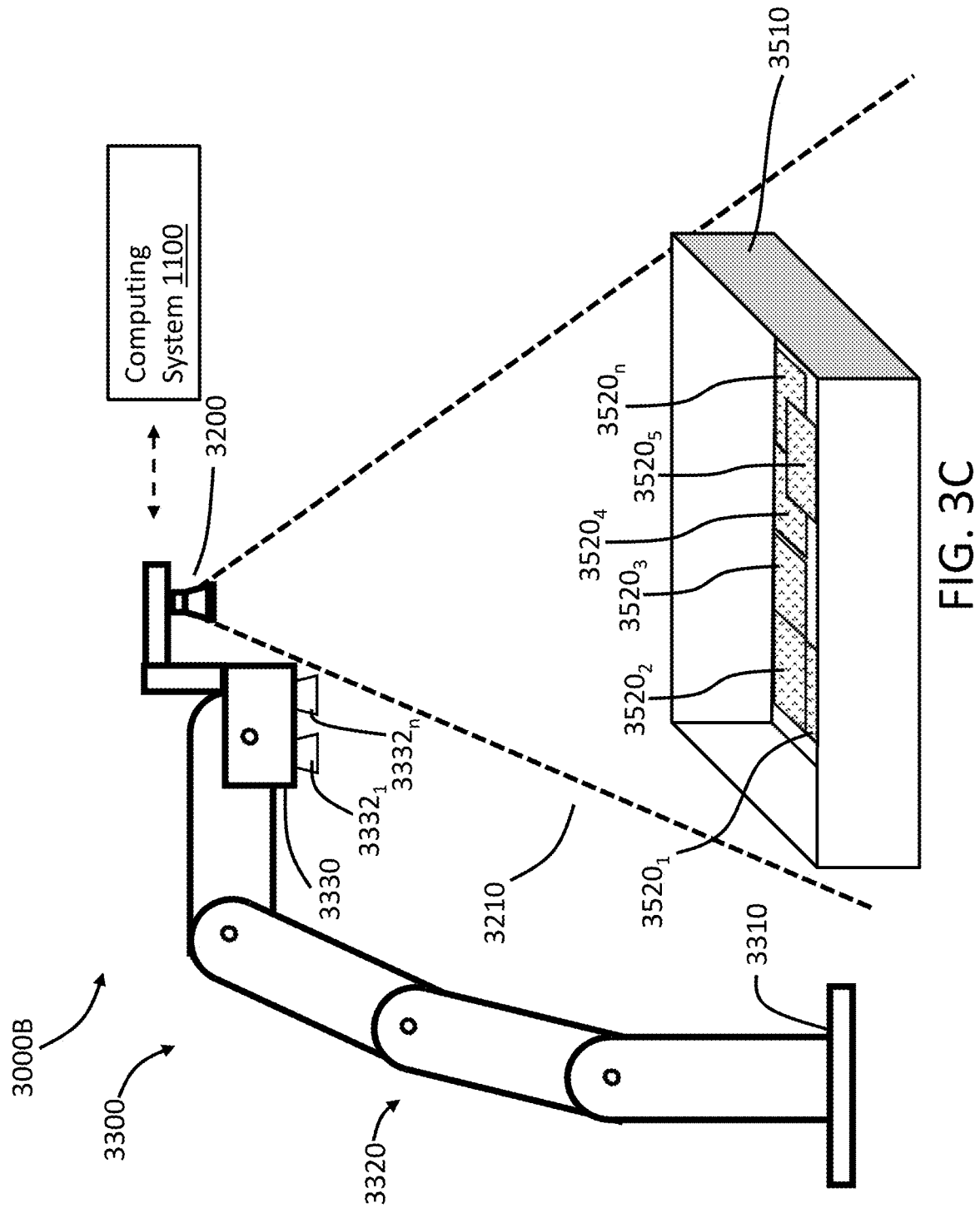

FIGS. 3A-3C illustrate an example environment in which a gripping region detection operation and/or a motion planning operation may be performed. More specifically, FIG. 3A depicts a system 3000 (which may be an embodiment of the system 1000/1000A/1000B/1000C of FIGS. 1A-1D) that includes the computing system 1100, a robot 3300, and a camera 3200. The camera 3200 may be an embodiment of the camera 1200, and may be configured to generate image information which represents a scene in a camera field of view 3210 of the camera 3200, or more specifically represents objects or their structures in the camera field of view 3210, such as objects $3520_1$ through $3520_n$ which may include, e.g., objects $3520_1$, $3520_2$, $3520_3$, $3520_4$, $3520_5$, ... $3520_n$. In the embodiments of FIGS. 3A-3C, the robot 3300 may be configured to manipulate or otherwise interact with each of the one or more of the objects $3520_1$-$3520_n$, such as by picking up or otherwise gripping one of the objects $3520_1$-$3520_n$, lifting the object from the object's current location, and moving the object to a destination location.

In some instances, some or all of the objects $3520_1$ through $3520_n$ may be a flexible object. For example, each of the objects $3520_1$ through $3520_n$ may be a package that has a piece of clothing (e.g., a shirt or pair of pants) or other textile or fabric, wherein the piece of clothing or other textile may be wrapped in a sheet of packaging material, such as a sheet of plastic. In some scenarios, the sheet of plastic or other packaging material may be generally impermeable to air or other fluids. In the example of FIG. 3A, the objects $3520_1$ through $3520_n$ may be disposed in a container 3510 such as a bin or box used to hold the $3520_1$ through $3520_n$ in a facility, such as a warehouse associated with a clothing manufacturer or retailer.

In some scenarios, a flexible object (e.g., $3520_1$) of the embodiments herein may have a sufficiently high level of flexibility to allow the flexible object to deform in shape when being moved or otherwise manipulated by the robot 3300. The sufficiently high level of flexibility may correspond with a sufficiently low level of stiffness or rigidity so as to prevent the object from maintaining its shape when it is being moved or otherwise manipulated by the robot 3300. In some instances, the flexible object may have a sufficiently high level of flexibility to permit a weight of the flexible object to cause deformation of its own shape when the flexible object is being lifted by the robot 3300. The deformation may involve, e.g., the flexible object bending, or more specifically sagging, under its own weight when being lifted by the robot 3300. The flexibility of the flexible object may arise from, e.g., dimensions of the flexible object and/or a material of the flexible object. In one example, the flexible object may have a thin profile, which may introduce flexibility (also referred to as pliability) into the flexible object. More specifically, the flexible object may have a thickness dimension which is considerably smaller in size relative to a size of a lateral dimension (e.g., length dimension or width dimension). In one example, the flexible object may be made of a material which is sufficiently soft to introduce flexibility to the flexible object. In some situations, the material of the flexible object may be sufficiently soft so as to sag under the material's own weight when the object is being lifted by the robot 3300. For instance, if the flexible object is package having a piece of clothing, it may be formed from a material, such as cotton fabric or wool fabric, that lacks enough stiffness to prevent the material from sagging under its own weight when being lifted by the robot 3300.

In an embodiment, the robot 3300 (which may be an embodiment of the robot 1300) may include a robot arm 3320 having one end attached to a robot base 3310, and having another end that is attached to or is formed by an end effector apparatus 3330. The robot base 3310 may be used for mounting one end of the robot arm 3320, while the other end of the robot arm 3320, or more specifically the end effector apparatus 3330, may be used to interact with one or more objects (e.g., $3520_1$, $3520_2$, etc.) in an environment of the robot 3300. The interaction may include, e.g., gripping and lifting the one or more objects, and/or moving the one or more objects from a current location to a destination location.

In an embodiment, the end effector apparatus 3330 may include one or more suction cups $3332_1$-$3332_n$ used to pick up or otherwise lift an object, such as one of the objects $3520_1$-$3520_n$. In some implementations, each of the suction cups $3332_1$-$3332_n$ (also referred to as end effector suction cups) may be a mechanical device that is configured, when pressed into contact against a surface of an object (e.g., $3520_1$), to reduce fluid pressure (e.g., air pressure) in a space between the suction cup and the surface of the object (also referred to as object surface). In one example, the object surface may be formed by a material that is generally impermeable to fluids, or more generally is non-porous, such as a sheet of plastic packaging material used to wrap a piece of clothing. The reduced fluid pressure, such as a partial or complete vacuum, may result in a pressure difference between fluid pressure outside of the space and fluid pressure within the space. More specifically, the fluid pressure within the space may be lower than fluid pressure outside of the space, which may create negative fluid pressure that causes the higher fluid pressure to exert a net force that affixes the suction cup to the object surface. The net force may act as an adhesive force that enables the suction cup to adhere to the object surface, so as to grip the object surface. In an embodiment, each of the suction cups (e.g., $3332_1$ or $3332_n$) may have a variety of shapes (e.g., circular shape) and sizes, and may have a variety of materials, such as plastic, silicone, nitrile, viton, vinyl, urethane, rubber, or some other flexible material. Suction cups are discussed in more detail in U.S. Pat. No. 10,576,630, entitled "Robotic system with a robot arm suction control mechanism and method of operation thereof," the entire content of which is incorporated by reference herein. In an embodiment, a strength of the adhesive force between the suction cup and the object surface may depend on how tightly the suction cup is able to seal the space between itself and the object surface. For instance, a tight seal may maintain the pressure difference, and thus maintain the adhesive force, while a loose seal may prevent the pressure difference from being maintained, and thus may interfere with an ability of the suction cup to grip the object surface. In an embodiment, an ability of the suction cup to form a tight seal may depend on a level of smoothness at a region of the object surface (also referred to as surface region) at which the suction cup is attempting to grip the object surface. Thus, as discussed below in more detail, the computing system 1100 may be configured to identify or search for a surface region which is sufficiently smooth to be used as a grip region, at which the suction cup can reliably adhere to and thus grip the object surface.

In an embodiment, the camera 3200 may be configured to generate image information which represents the objects 3520$_1$-3520$_n$ and the container 3510, or any other object(s) in the camera field of view 3210. The camera 3200 may be a 3D camera that is configured to generate 3D image information, and/or a 2D camera that is configured to generate 2D image information. In an embodiment, the 3D image information may represent an object surface for an object (e.g., 3520$_1$), or more specifically describe a physical structure of the object surface. For example, the 3D image information may include a depth map, or more generally include depth information, which may describe respective depth values of various locations in the camera field of view 3210 relative to the camera 3200 or relative to some other reference point. The locations corresponding to the respective depth values may be locations on various surfaces in the camera field of view 3210, such as locations on respective object surfaces of the objects 3520$_1$ through 3520$_n$. In some instances, the 3D image information may include a point cloud, which may include a plurality of 3D coordinates that describe various locations on the respective object surfaces of the objects 3520$_1$ through 3520$_n$ in the camera field of view 3210.

In an embodiment, an object surface for an object (e.g., 3520$_1$) may refer to an outer surface (e.g., top surface) of the object. In such an embodiment, the 3D image information may represent the outer surface, or more specifically may describe a physical structure of the outer surface. For example, if the camera 3200 generates the 3D image information by sensing light (e.g., laser or structured light) or other signal reflecting from the outer surface, the 3D information may represent, e.g., a surface contour of the outer surface. If the outer surface is formed by a transparent material, such as a thin sheet of flexible plastic used as packaging material, the 3D information may still represent the outer surface of the object. More particularly, the camera 3200 in such a situation may be sensing light or other signal which has reflected off a non-transparent material, such as a piece of clothing fabric, that is beneath or otherwise covered by the transparent material. The reflected light or signal may pass through the transparent material, and may be detected by the camera 3200 to generate the 3D information. In this situation, the transparent material (e.g., plastic sheet) may be sufficiently thin such that a distance between the outer surface and a surface of the non-transparent material may be considered to be negligible. Thus, in an embodiment, the 3D information may be considered to be describing depth information for various locations on an outer surface of an object. Additionally, if a transparent material forms the outer surface, the transparent material may be sufficiently flexible so that all or many portions of the transparent material adopt a surface contour of the underlying non-transparent material. Thus, the 3D image information in this situation may be considered as describing the outer surface of the object, or more specifically a physical structure or surface contour of the outer surface.

In an embodiment, 2D image information may include, e.g., a color image or a grayscale image that represents an appearance of one or more objects in the camera field of view 3210. For instance, if an object surface has visual markings (e.g., a logo) or other visual detail printed thereon, the 2D image information may describe or otherwise represent the visual detail. As stated above, the object surface may be an object's outer surface, which may in some situations be formed from a transparent material. In such situations, the 2D image information may represent light (e.g., visible light) or other signal which has reflected from a surface of an underlying non-transparent material (e.g., a shirt) and passed through the transparent material forming the outer surface. Because the 2D image information in such a situation is based on light or other signal passing through the outer surface, the 2D image information may still be considered to represent the outer surface. Further, the transparent material forming the outer surface may in some instances be sufficiently thin and sufficiently transparent to have little or negligible effect on an appearance of an object, such that the appearance of the object or of an outer surface of the object may be considered to be referring to an appearance of an underlying non-transparent material (e.g., clothing material).

In an embodiment, the system 3000 may include multiple cameras. For instance, FIG. 3B illustrates a system 3000A (which may be an embodiment of the system 3000) that includes a camera 3200A having a camera field of view 3210A, and including a camera 3200B having a camera field of view 3210B. The camera 3200A (which may be an embodiment of the camera 1200A) may be, e.g., a 2D camera that is configured to generate a 2D image or other 2D image information, while the camera 3200B (which may be an embodiment of the camera 1200B) may be, e.g., a 3D camera that is configured to generate 3D image information.

In an embodiment, the camera 3200/3200A/3200B may be stationary relative to a reference point, such as a floor on which the container 3510 is placed or relative to the robot base 3310. For example, the camera 3200 in FIG. 3A may be mounted to a ceiling, such as a ceiling of a warehouse, or to a mounting frame which remains stationary relative to the floor, relative to the robot base 3310, or some other reference point. In an embodiment, the camera 3200 may be mounted on the robot arm 3320. For instance, FIG. 3C depicts a system 3000B (which may be an embodiment of the system 1000) in which the camera 3200 is attached to or otherwise mounted on the end effector apparatus 3330, which forms a distal end of the robot arm 3200. Such an embodiment may provide the robot 3300 with an ability to move the camera 3200 to different poses via movement of the robot arm 3320.

FIG. 4 depicts a flow diagram for an example method 4000 for performing gripping region detection. The method 4000 may be performed by, e.g., the computing system 1100 of FIGS. 2A-2C or of FIGS. 3A-3C, or more specifically by the at least one processing circuit 1110 of the computing system 1100. In some scenarios, the at least one processing circuit 1100 may perform the method 4000 by executing instructions stored on a non-transitory computer-readable medium (e.g., 1120). For instance, the instructions may cause the processing circuit 1110 to execute one or more of the modules illustrated in FIG. 2C, which may perform method 4000. As an example, steps 4002-4006 discussed below may be performed by the grip region detection module 1127, while step 4008 may be performed by the motion planning module 1129. In an embodiment, the method 4000 may be performed in an environment in which the computing system 1100 is in communication with a robot and a camera, such as the robot 3300 and the camera 3200/3200A/3200B in FIGS. 3A-3B, or with any other camera or robot discussed in this disclosure.

In an embodiment, one or more steps of the method 4000 may be performed when an object, or more specifically a flexible object (e.g., 3520$_1$, 3520$_2$, etc.) is in a camera field of view (e.g., 3210/3210A/3210B) of the camera (e.g., 3200/3200A/3200B). For instance, one or more steps of the method 4000 may be performed immediately after the object is in the camera field of view (e.g., 3210/3210A/3210B) or, more generally, while the object is in the camera field of view. In some scenarios, the one or more steps of the method 4000 may be performed when the object is or has been in the camera field of view. For example, when the object is in the camera field of view (e.g., 3210/3210A/3210B), the camera (e.g., 3200/3200A/3200B) may generate image information representing the object, or more specifically a surface of the object (also referred to as object surface), and may communicate the image information to the computing system (e.g., 1100). The computing system may perform one or more steps of the method 4000 based on the image information, while the object is still in the camera field of view, or even when the object is no longer in the camera field of view.

In an embodiment, the method 4000 may begin with or otherwise include a step 4002, in which the computing system 1100 receives image information representing an object surface of an object, such as a flexible object, in a camera field of view (e.g., 3210/3210A/3210B) of the camera (e.g., 3200/3200A/3200B). In an embodiment, the image information may be generated by the camera (e.g., 3200) when the object is (or has been) in the camera field of view, and may include, e.g., 3D image information and/or 2D image information.

Figure 5A:
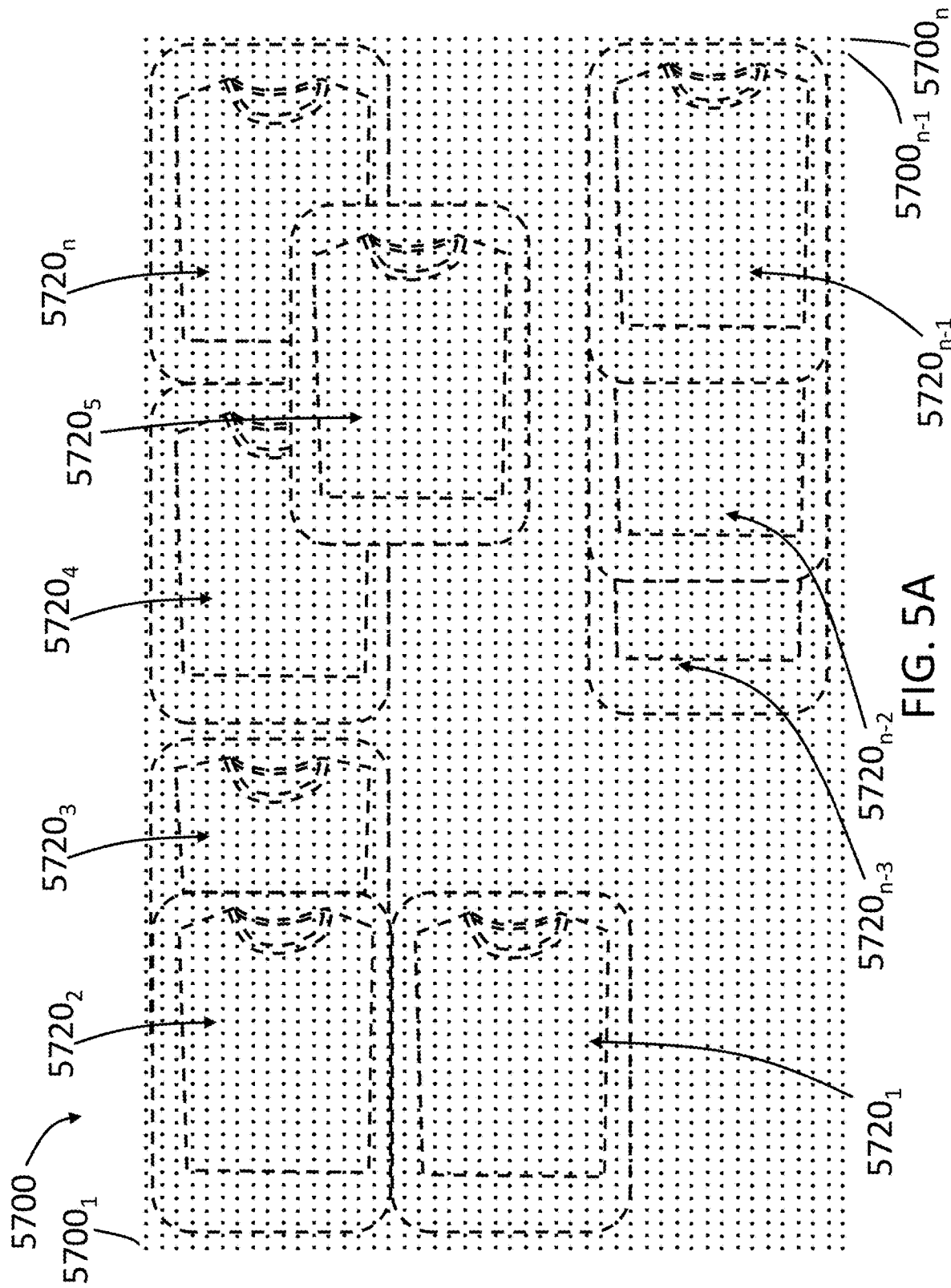
FIGS. 5A and 5B illustrate example image information from which a grip region and/or a safety region may be identified, according to an embodiment hereof.

As an example, FIG. 5A depicts an example in which the image information in step 4002 includes 3D image information 5700. More particularly, the 3D image information 5700 may include, e.g., a depth map or other depth information which indicates respective depth values of various locations in the camera field of view (e.g., 3200/3200A), such as locations $5700_1$, $5700_2$, ... $5700_n$ which may be a grid of locations organized into rows and columns. In some implementations, the depth map may include pixels that indicate respective depth values for the locations $5700_1$-$5700_n$. In an embodiment, at least some of the locations $5700_1$-$5700_n$ are locations on one or more object surfaces, such as object surfaces of the objects $3520_1$-$3520_n$. For example, the 3D image information 5700 may include image portions $5720_1$, $5720_2$, $5720_3$, $5720_4$ $5720_5$, ... $5720_{n-3}$, $5720_{n-2}$, $5720_{n-1}$, $5720_n$ wherein each of the image portions may include depth values for a respective set of locations on an object surface of a respective object (e.g., $3520_1$, $3520_2$, $3520_3$, ..., or $3520_n$). In some situations, the 3D image information may include a point cloud, which may include a set of coordinates that describe the locations $5700_1$-$5700_n$ respectively. The coordinates may be 3D coordinates, such as [X Y Z] Cartesian coordinates, and may have values that are relative to a camera coordinate system, or some other coordinate system. In this example, a [X Y Z] coordinate for a particular location (e.g. $5700_1$) may have a Z-component which is equal to or based on a depth value for that location. The depth value may be relative to the camera (e.g., 3200/3200A) which generated the 3D image information, or may be relative to some other reference point.

In an embodiment, the 3D image information may describe a surface contour of an object surface. For instance, the 3D image information 5700 in FIG. 5A may have at least an image portion $5720_1$ that describes a surface contour of an object surface for the object surface $3520_1$. A surface contour of the object surface may describe a physical structure of the object surface. In some instances, the physical structure of the object surface may be completely or substantially smooth. In some instances, the physical structure of the object surface may include physical features, such as wrinkles, bumps, ridges, creases, or depressions, which may form one or more non-smooth portions of the object surface.

As stated above, the object surface may be an outer surface (e.g., top surface) of an object, and may be formed by a transparent material, a non-transparent material (e.g., a translucent or opaque material), or a combination thereof. As further stated above, if the outer surface is formed by a transparent material which covers an underlying non-transparent material, the transparent material may be sufficiently thin and flexible to be considered to have a negligible effect on a physical structure or surface contour of the object. In such instances, 3D image information which represents a physical structure or surface contour of the underlying non-transparent material may be considered to also represent a physical structure or surface contour of the outer surface of the object. Further, if the transparent material is sufficiently thin, its thickness may be considered to have a negligible effect on depth measurement by a camera (e.g., 3200). In such a situation, the various locations that have depth values represented in the 3D image information, such as locations of image portion $5720_1$, may be considered to be locations on an outer surface of a corresponding object (e.g., $3520_1$).

Figure 5B:
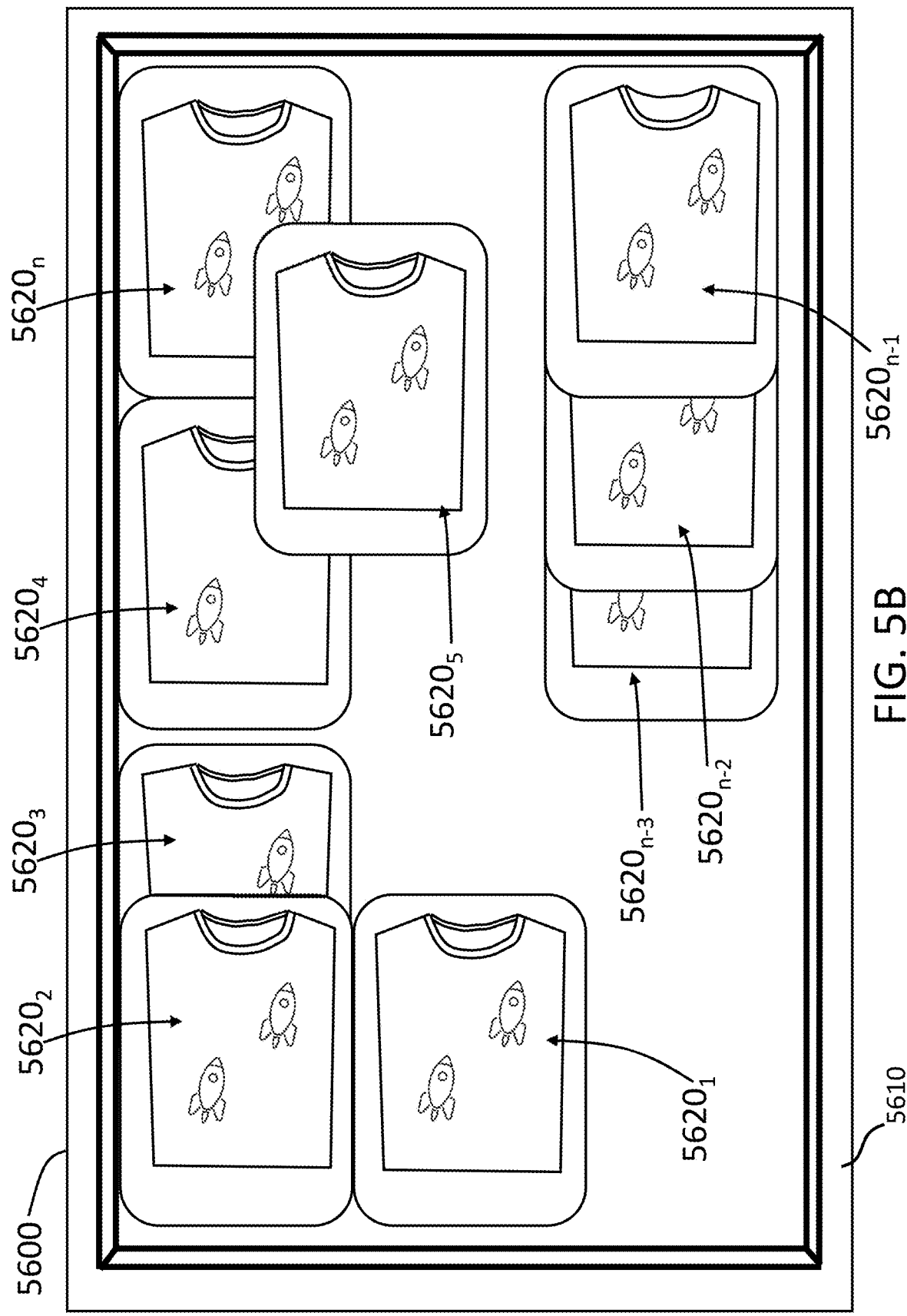

FIG. 5B depicts 2D image information, or more specifically a 2D image 5600, which is generated by the camera 3200/3200B and which represents the objects $3520_1$-$3520_n$ and the container 3510 of FIGS. 3A-3C. More specifically, the 2D image 5600 may describe an appearance of the objects $3520_1$-$3520_n$ and the container 3510 in which the objects $3520_1$-$3520_n$ are disposed. More specifically, the 2D image 5600 may include image portions $5610_1$, $5620_2$, $5620_3$, $5620_4$, $5620_5$, ... $5620_{n-3}$, $5620_{n-2}$, $5620_{n-1}$, $5620_n$ (e.g., pixel regions) that represent visual detail of the objects $3520_1$, $3520_2$, $3520_3$, ... $3520_n$ respectively. In an embodiment, the 2D image information may represent an object surface for an object (e.g., $3520_1$). As stated above, the object surface may be an outer surface (e.g., top surface) of an object, and may be formed by a transparent material, a non-transparent material (e.g., a translucent or opaque material), or a combination thereof. As further stated above, if the outer surface is formed by a transparent material which covers an underlying non-transparent material, the transparent material may be sufficiently thin and transparent to be considered to have a negligible effect on an appearance of the object. In such instances, an appearance of the underlying non-transparent material may be considered to also be an appearance of an outer surface of the object, such that the 2D image information is considered to represent the appearance of the outer surface of the object.

In an embodiment, the computing system 1100 may be configured to determine whether the received image information has any gap in which pixel values are unavailable or have an amount error above a certain error threshold. For example, the computing system 1100 may determine whether the image information has a highlight region, which may be a region of pixels that were oversaturated by light or other signal reflecting from a scene in a camera field of view. For example, the highlight region may represent glare from a portion of an object surface, wherein the glare is caused by reflected light which has too much intensity. The glare may introduce noise that causes resulting pixels of the image information to have inaccurate values, such that the resulting pixels may form a gap in the image information. In such an embodiment, the computing system 1100 may be configured to fill the gap in the image information with estimated pixel values. The estimated values may be determined based on, e.g., interpolating from pixel values of neighboring pixels around the gap.

Figure 6:
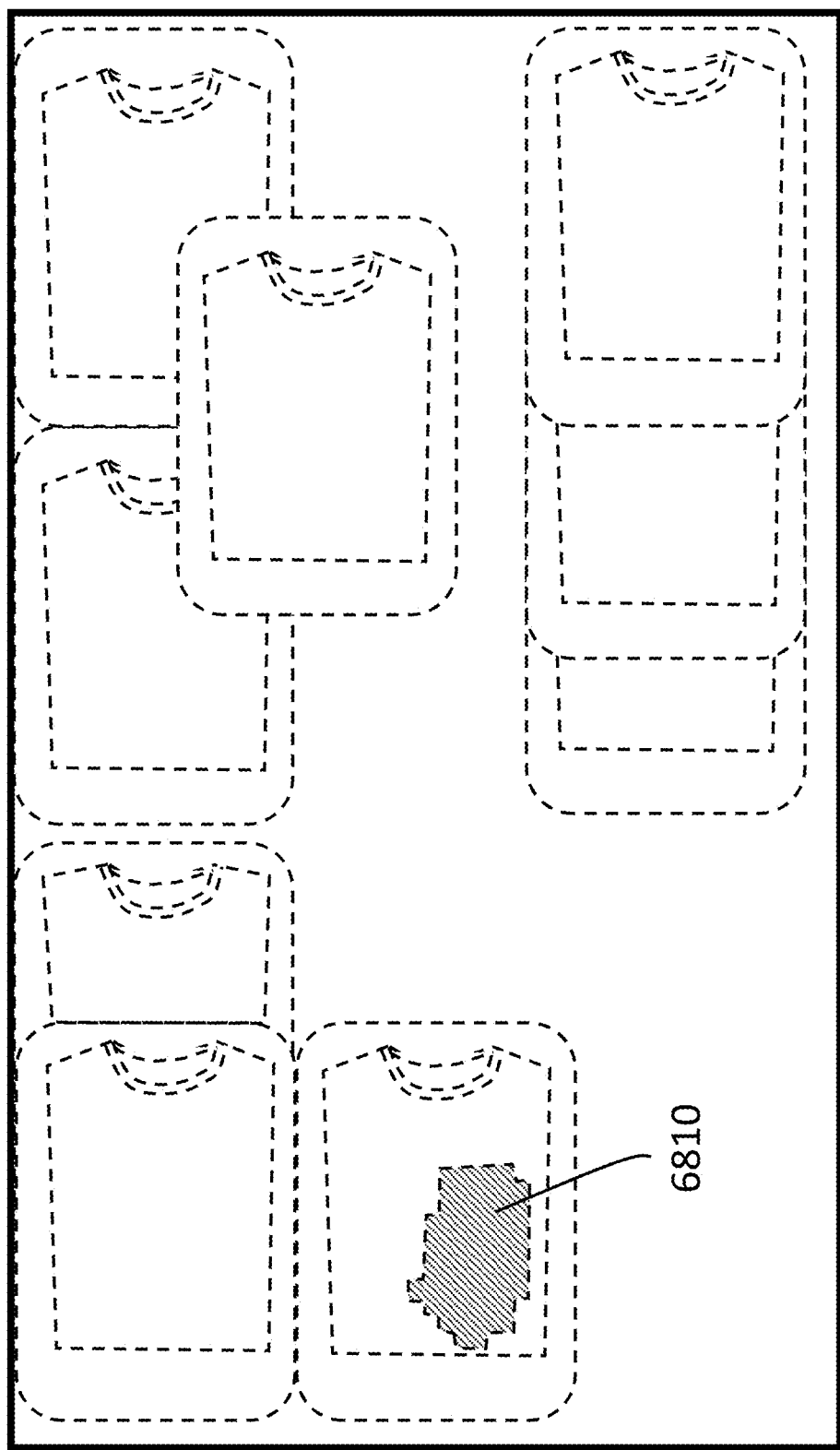
FIG. 6 illustrates a surface region which may be identified as a grip region, according to an embodiment hereof.

Returning to FIG. 4, the method 4000 may in an embodiment include a step 4004, in which the computing system 1100 may identify a grip region based on the image information received in step 4002. More specifically, the computing system 1100 may identify, as a grip region, a surface region of the object surface that satisfies a defined smoothness condition and has a region size that is larger than or equal to a defined region size threshold. In an embodiment, the grip region (also referred to as a pickable region) may be a surface region of an object (e.g., $3520_1$) that is identified by the computing system 1100 to be suitable for the object to be picked up or otherwise gripped by a robot, or to receive some other robot interaction. For example, FIG. 6 provides an example in which the computing system identifies a surface region 6810 as a grip region by which the object $3520_1$ can be gripped by the end effector apparatus 3330, or more specifically by the one or more suction cups $3332_1$-$3332_n$ of the end effector apparatus 3330. FIG. 9B, which is discussed below, illustrates another example of a grip region 6812. The computing system 1100 may determine that the surface region 6810 satisfies a defined smoothness condition. In an embodiment, the defined smoothness condition may be, e.g., predefined in the non-transitory computer-readable medium 1120, or may be defined dynamically by the computing system 1100. For example, if the defined smoothness condition is formed by one or more criteria, which may involve satisfying one or more thresholds, rules or other information describing the one or more criteria or the one or more thresholds may be predefined and stored in the non-transitory computer-readable medium 1120.

In some instances, the defined smoothness condition for a surface region (e.g., 6810) may be associated with the surface region being sufficiently smooth for an intended purpose, such as being picked up or otherwise gripped by an end effector apparatus. Being gripped by the end effector apparatus may involve, e.g., a suction cup or other component of the end effector apparatus making contact with the surface region (e.g., 6810). As stated above, the end effector apparatus may in some scenarios press the suction cup into contact against the surface region in an attempt to create a sealed space having negative fluid pressure, which creates adhesion between the suction cup and the surface region. In such an example, satisfying the smoothness condition may involve the surface region being sufficiently smooth so as to provide a sufficient amount of contact between itself and the suction cup or other component of the end effector apparatus. For instance, the smoothness condition may involve the surface region (e.g., 6810) being sufficiently smooth so that the suction cup, when pressed against the surface region, will reliably form a seal around the space between the suction cup and the surface region so as to maintain negative fluid pressure in that space and to create a sufficient level of adhesion between the suction cup and the surface region. In such an instance, the computing system 1100 may determine that the surface region (e.g., 6810) is suitable for use as a grip region.

In some implementations, smoothness of a surface region or a surface may involve an absence of physical features, such as wrinkles, bumps, ridges, creases, or dimples protruding from or sinking into the surface region or surface. More particularly, presence of such physical features may decrease a maximum possible contact area which can be made between the end effector apparatus and the surface region, or more specifically may interfere with an ability of a suction cup or other component of the end effector apparatus to create a seal around a space between the suction cup and the surface region. Thus, a surface region (e.g., 6810) that satisfies the smoothness condition may generally be free or substantially free of such physical features.

In an embodiment, the defined smoothness condition may be defined by one or more criteria, such as an orientation similarity criterion and/or a depth similarity criterion, which are discussed below in more detail. The orientation similarity criterion may involve smaller patches that form the surface region having sufficiently similar orientation, while the depth similarity criterion may involve the smaller patches being sufficiently close to each other along a depth dimension, or more specifically along an axis parallel with a normal vector of one of the patches. As stated above, rules or other information describing the orientation similarity criterion and/or depth similarity criterion may be predefined or defined dynamically, and may be stored in the non-transitory computer-readable medium 1120.

In some implementations, the defined smoothness condition may be satisfied by surface regions that are smooth and flat, as well as by surface regions that are smooth and have some amount of curvature. For instance, if the computing system 1100 divides a surface region into smaller patches, the orientation similarity criterion in such implementations may be satisfied by patches that have small differences in orientation. Such small differences may account for surface regions that have a gentle curvature. Such implementations may reflect an assessment that a surface region which is smooth but has a gentle curvature may still be able to permit a large amount of contact between itself and a suction cup or some other component of an end effector apparatus (e.g., 3330), and thus may still be able to permit a robust amount of adhesion to be reliably formed between the surface region and suction cup.

In some implementations, a surface region that satisfies the defined smoothness condition may have to be both smooth and flat or substantially flat. For instance, the orientation similarity criterion in such implementations may be more strict than in the example discussed above involving smooth surfaces having a gentle curvature. In these implementations, patches may have to be much more similar in orientation to satisfy the defined orientation similarity criterion. As a result, a surface region formed by the patches may have a much smaller level of curvature, or no curvature. Such implementations may reflect an assessment that a surface region needs to be both smooth and flat or substantially flat to permit a robust amount of adhesion to be reliably formed between itself and a suction cup or some other component of an end effector apparatus (e.g., 3330). Thus, a level of strictness of the orientation similarity criterion may be used to control how flat is a surface region identified as a grip region.

In an embodiment, the computing system 1100 may determine, as a prerequisite to identifying a surface region (e.g., 6810/6812 of FIGS. 6 and 9B) as a grip region, whether the surface region (e.g., 6810) is larger than or equal to a defined region size threshold. Such a prerequisite may ensure that the surface region (e.g., 6810/6812) is not only sufficiently smooth, but that it is also sufficiently large to be gripped by or receive some other interaction from a robot (e.g., 3300). In some instances, the defined region size threshold may be or may indicate a surface area threshold, such that the computing system 1100 determines whether a total surface area of the surface region (e.g., 6810/6812) identified as a grip region is larger than or equal to the surface area threshold. The defined region size threshold may be, e.g., predefined or dynamically defined, and may be stored in the non-transitory computer-readable medium 1120. In some instances, the defined region size threshold may indicate one or more values for one or more respective dimensions, such as radius, length, and/or width. More specifically, the defined region size threshold may define a contact region or other interaction region for interaction between an object surface and a robot. The contact region may have the one or more values for one or more respective dimensions. In such instances, the computing system 1100 may determine whether such a contact region will fit within the surface region (e.g., 6810).

Figure 7A:
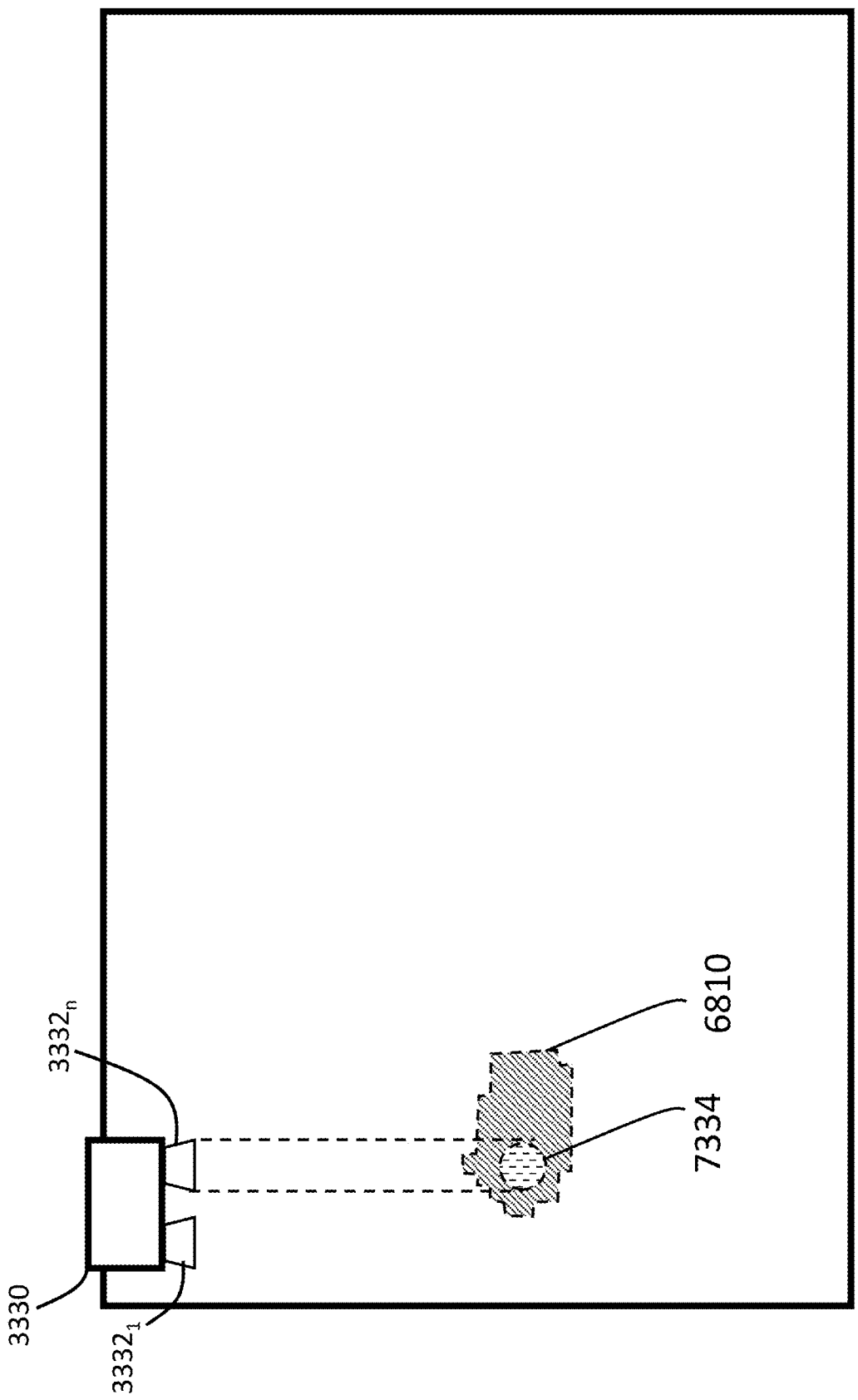

More specifically, the defined region size threshold may in some scenarios be a defined contact region size associated with contact between an end effector apparatus (e.g., 3330) and an object, or more specifically a flexible object. For instance, if the surface region 6810 of FIG. 6 is part of an object 3520$_1$ of FIGS. 3A-3C, the defined region size threshold may be a defined contact region size associated with contact between one or more components (e.g., suction cups 3332$_1$-3332$_n$) of an end effector apparatus and the object 3520$_1$. The defined contact region size may be a size of a contact region for the one or more components to be pressed against or otherwise make contact the object (e.g., 3520$_1$). As an example, FIG. 7A depicts a contact region 7334 in which one suction cup (e.g., 3332$_n$) of the one or more suction cups contact the surface region 6810 of the object 3520$_1$. In such an example, the defined contact region size may be a defined cup size associated with a suction cup, such as suction cup 3332$_n$, such that the defined region size threshold may be the defined suction cup size (e.g., radius of the suction cup). FIG. 7B depicts another contact region 7335 in which multiple suction cups (e.g., 3332$_1$ and 3332$_n$) make contact with the surface region 6810 of the object 3520$_1$. In the example of FIG. 7B, the defined region size threshold may be a size of the contact region 7335. If the multiple suction cups form an array of suction cups, the defined region size threshold may be a defined size of the array (also referred to as a defined array size). The computing system 1100 may compare a size of the surface region (e.g., 6810) to the defined region size threshold to better ensure that, if the surface region is identified as a grip region, that the grip region is large enough to fit a contact region (e.g., 7334, 7335) having the defined contact region size. In other words, a surface region (e.g., 6810) which satisfies the defined region size threshold may be large enough to receive contact, or more generally to be engaged by, one or more components of an end effector apparatus (e.g., 3330) used to grip an object (e.g., 3520$_1$) at the surface region. The defined sizes discussed above may be, e.g., predefined or dynamically defined, and may be stored in the non-transitory computer-readable medium 1120.

In some scenarios, the defined region size threshold may be a defined object size associated with the object (e.g., 3520$_1$). In such scenarios, the defined object size may, e.g., describe a border or edges of the object. The computing system 1100 may then determine whether a surface region that satisfies the defined smoothness condition is further large enough to fit an object or region having such a border or edges. The use of such a defined region size threshold may allow the computing system 1100 to more strictly check whether the surface region (e.g., 6810) belongs to or is otherwise associated with an object (e.g., 3520$_1$) that is to be gripped and moved by a robot (e.g., 3330).

Figure 8A:
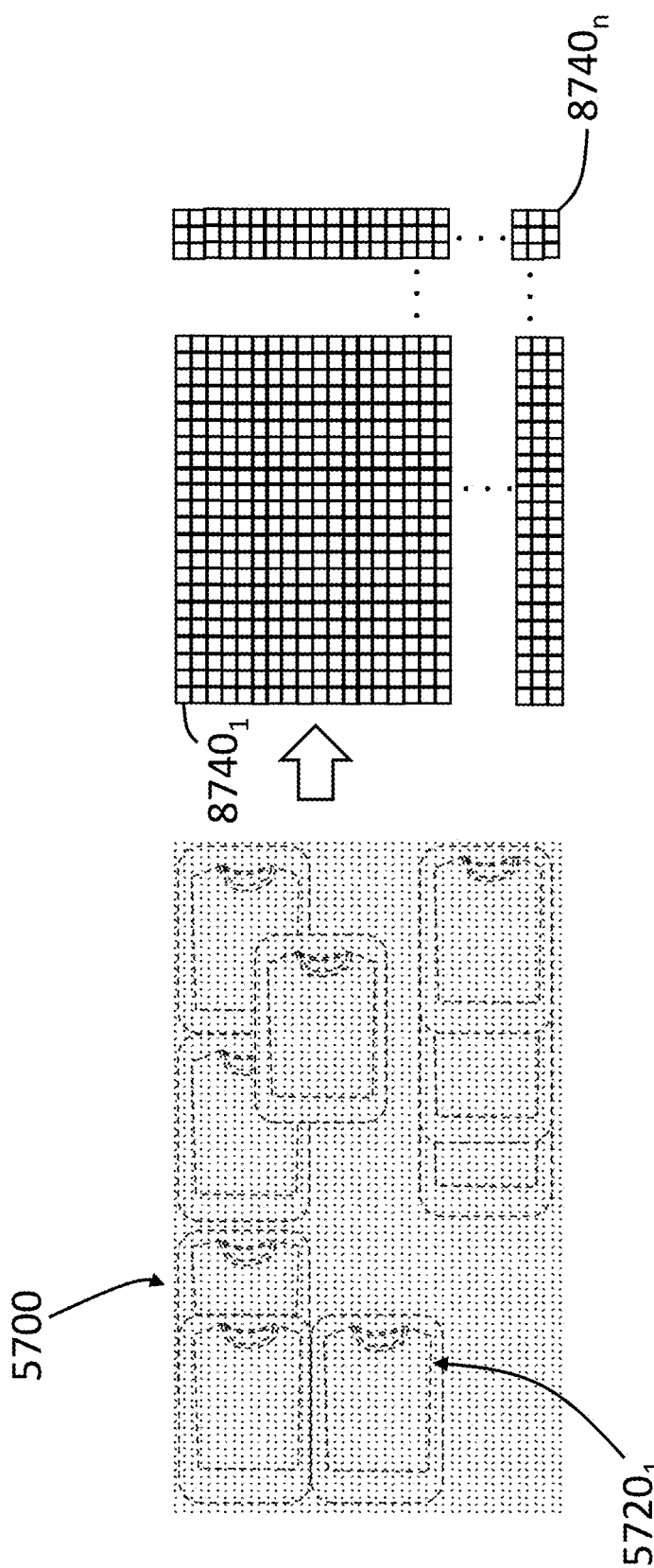
FIGS. 8A-8G illustrate various aspects of identifying a grip region, according to an embodiment hereof.
Figure 8B:
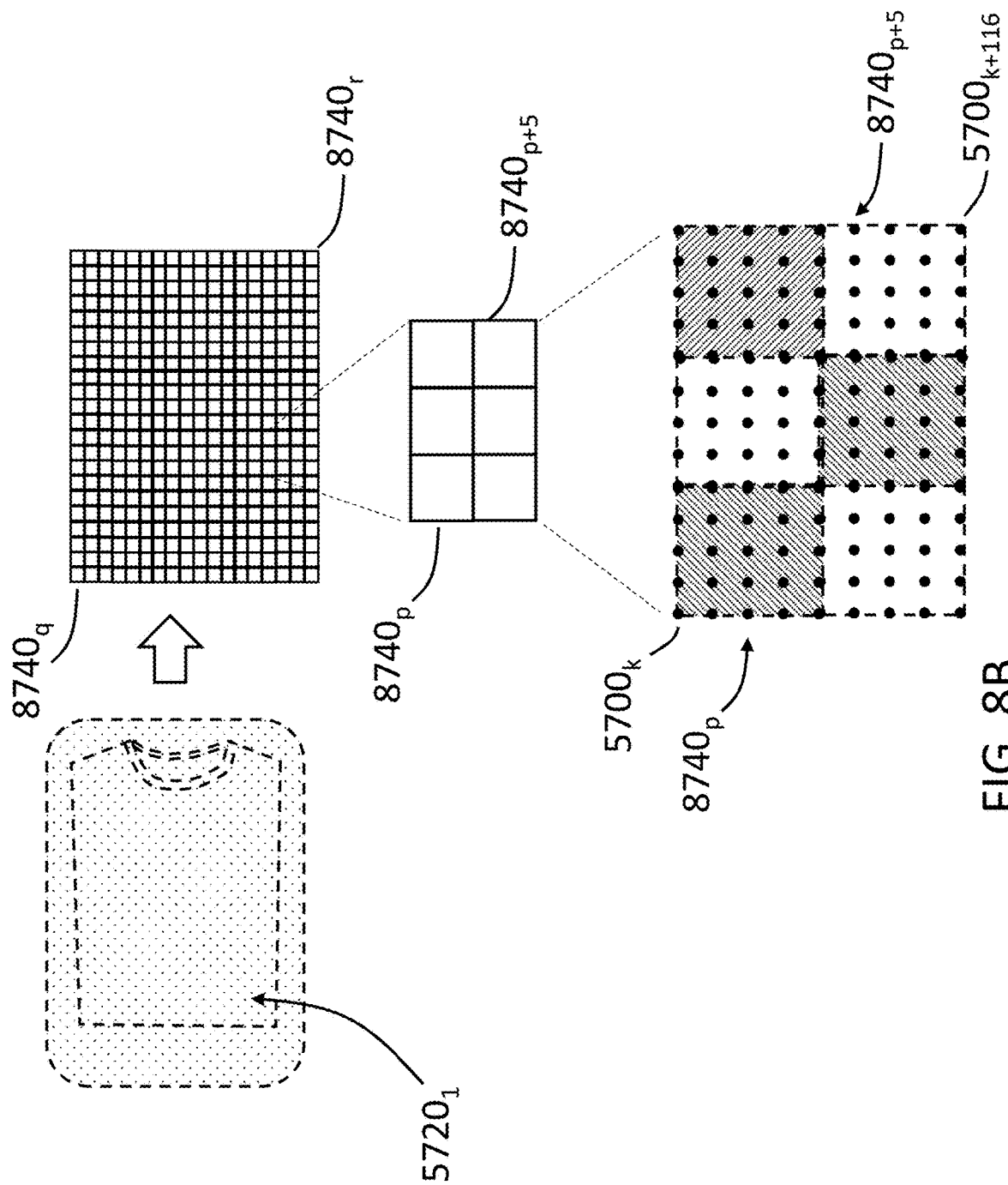

In an embodiment, the computing system 1100 may identify a smooth surface region, or more specifically a surface region that satisfies the defined smoothness condition, by dividing an object surface into a plurality of two-dimensional (2D) patches, and determining whether the plurality of 2D patches include a set of contiguous 2D patches that form a sufficiently smooth surface region. For instance, FIG. 8A depicts an example that divides surfaces represented by the 3D image information into a plurality of 2D patches 8740$_1$ through 8740$_n$ (which are not necessarily drawn to scale). Each 2D patch of the plurality of 2D patches may be an imaginary 2D patch, also referred to as an imaginary 2D plane, formed by a group of locations that are part of the plurality of locations represented by the image information received in step 4002. More specifically, the image information may describe depth information for a plurality of locations in a camera field of view, such as the plurality of locations 5700$_1$ through 5700$_n$ discussed with respect to FIG. 5A. The image information may include, e.g., a depth map or a point cloud having a grid of pixels (also referred to as an array of pixels). In this example, the computing system 1100 may identify a grip region by determining the plurality of 2D patches 8740$_1$-8740$_n$ and identifying a set of contiguous 2D patches from the plurality of 2D patches that satisfy the defined smoothness condition. More specifically, the plurality of 2D patches 8740$_1$ through 8740$_n$ may represent object surfaces of objects in a camera field of view (e.g., 3210), such as objects 3520$_1$-3520$_n$. For instance, the 3D image information 5700 may include an image portion 5720$_1$ that represents an object surface for the object 3520$_1$, and the plurality of patches 8740$_1$ through 8740$_n$ may include a section of patches that also represent the object surface for the object 3520$_1$. FIG. 8B depicts the section of patches, namely patches 8740$_q$-8740$_r$, which may be formed based on the image portion 5720$_1$. Thus, the section of patches 8740$_q$-8740$_r$ may represent an object surface for the object 3520$_1$.

In an embodiment, the plurality of 2D patches 8740$_1$-8740$_n$ may be 2D planes which attempt to fit or otherwise approximate respective subsets of the plurality of locations 5700$_1$-5700$_n$. That is, each 2D patch may fit or otherwise approximate a respective subset of locations, wherein the respective subset of locations are part of the plurality of locations 5700$_1$-5700$_n$. As an example, FIG. 8B illustrates how the computing system 1100 determines or identifies 2D patches 8740$_p$ through 8740$_{p+5}$, which may be part of the plurality of 2D patches 8740$_1$-8740$_n$, or more specifically part of the section of patches 8740$_q$-8740$_r$. In this example, the 2D patches may be determined or identified based on locations described by the image information received in step 4002, such as locations 5700$_k$-5700$_{k+116}$ in FIG. 8B, which may be part of the locations 5700$_1$-5700$_n$.

Figure 8C:
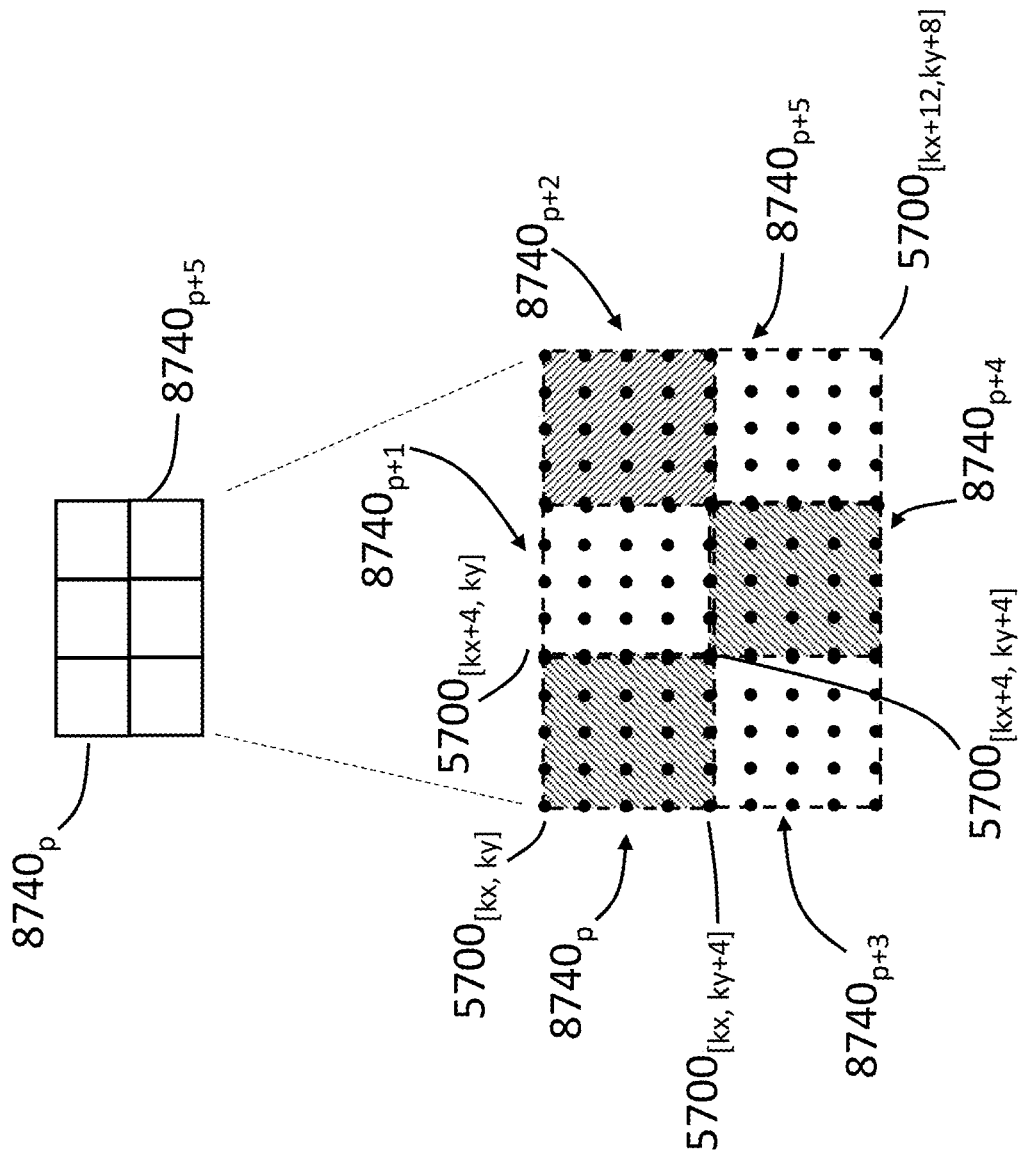

As stated above, the plurality of locations 5700$_1$-5700$_n$, including the locations 5700$_k$-5700$_{k+116}$, may be organized into a grid of locations having rows and columns. For instance, FIG. 8C illustrates the locations 5700$_k$-5700$_{k+116}$ being organized as a grid of locations 5700$_{[kx, ky]}$ through 5700$_{[kx+12, ky+8]}$. In such an example, the grid of locations 5700$_{[kx, ky]}$ through 5700$_{[kx+12, ky+8]}$ may be represented by a grid of corresponding pixels, such as a grid of 13×9 pixels, which may be a portion of the image information received in step 4002. For instance, the image information may be a depth map or point cloud that includes pixels describing respective depth values for the locations 5700$_{[kx, ky]}$ through 5700$_{[kx+12, ky+8]}$. More particularly, the image information may include a point cloud with includes a respective [X Y Z] coordinate for each location of the locations 5700$_{[kx, ky]}$ through 5700$_{[kx+12, ky+8]}$. In such an example, the section of 2D patches 8740$_p$ through 8740$_{p+5}$ may each fit or otherwise approximate a respective subset of the locations 5700$_{[kx, ky]}$ through $5700_{[kx+12,\ ky+8]}$, wherein the subset may include, e.g., a grid of 5×5 locations corresponding to 5×5 pixels of the image information. Each pixel in this example may include a [X Y Z] coordinate for a corresponding location represented by the pixel.

As an example, the computing system 1100 may determine or identify the 2D patch $\mathbf{8740}_p$ as an imaginary 2D plane which fits through a subset that includes locations $\mathbf{5700}_{[kx,\ ky]}$ through $\mathbf{5700}_{[kx+4,\ ky+4]}$, or more specifically through a 5×5 grid of locations bound by corner locations $\mathbf{5700}_{[kx,\ ky]}$, $\mathbf{5700}_{[kx+4,\ ky]}$, $\mathbf{5700}_{[kx,\ ky+4]}$, and $\mathbf{5700}_{[kx+4,\ ky+4]}$. The 5×5 grid of locations may correspond to a 5×5 grid of respective pixels of the image information, which may describe respective coordinates (e.g., [X Y Z] coordinates) for the grid of locations. In such an example, the computing system 1100 may determine 2D patch $\mathbf{8740}_p$ by performing a plane fitting operation to determine an imaginary 2D plane that fits through the respective coordinates. The plane fitting operation may involve identifying an imaginary 2D plane which has a sufficiently low amount of deviation from the respective coordinates, such as an amount of deviation that is below a defined deviation threshold. In some instances, the plane fitting operation for the 2D patch $\mathbf{8740}_p$ may involve identifying an imaginary 2D plane which best fits through the respective coordinates discussed above.

In an embodiment, the plurality of 2D patches (e.g., $\mathbf{5700}_1$ through $\mathbf{5700}_n$) may facilitate an ability of the computing system 1100 to evaluate smoothness of an object surface in a manner that is robust or tolerant against noise. More specifically, the image information received in step 4002 may in some instances include orientation information for each individual pixel of the image information. The orientation at a pixel may describe an orientation associated with a location represented by the pixel. Although the computing system 1100 may attempt to use the orientation information associated with individual pixels to evaluate smoothness of an object surface, such orientation information may include error caused by imaging noise or some other source of error. To compensate against such a source of error, the computing system 1100 may determine 2D patches that are each based on multiple pixels, or more specifically, a grid of pixels (e.g., a 5×5 or 10×10 grid of pixels), and use orientations associated with respective 2D patches to evaluate the smoothness of the object surface. Because each of the 2D patches are based on multiple pixels, an error in any one of the pixels may be averaged out or otherwise mitigated by information in the other pixels. Thus, orientation information which is derived from the 2D patches may provide a more accurate or reliable way of evaluating smoothness across the object surface.

In an embodiment, the plurality of 2D patches (e.g., $\mathbf{5700}_1$ through $\mathbf{5700}_n$) may each have a sufficiently small size to allow the plurality of 2D patches to represent one or more object surfaces with a high degree of granularity or detail. Such a degree of granularity may allow the computing system 1100 to use the plurality of 2D patches to detect even small physical features that introduce non-smoothness to an object surface. For example, each of the 2D patches may have a size of 5×5 pixels. In other words, each of the 2D patches may cover a region represented by a 5×5 grid of pixels of the image information. The computing system 1100 may be able to use the plurality of 2D patches in this example to detect wrinkles, bumps, creases, dimples, or other physical features that reduce smoothness of a surface, even if such physical features are relatively small. For instance, the plurality of 2D patches may be able to detect a wrinkle or other physical feature at a resolution that is on the order of tens of pixels.

Figure 8D:
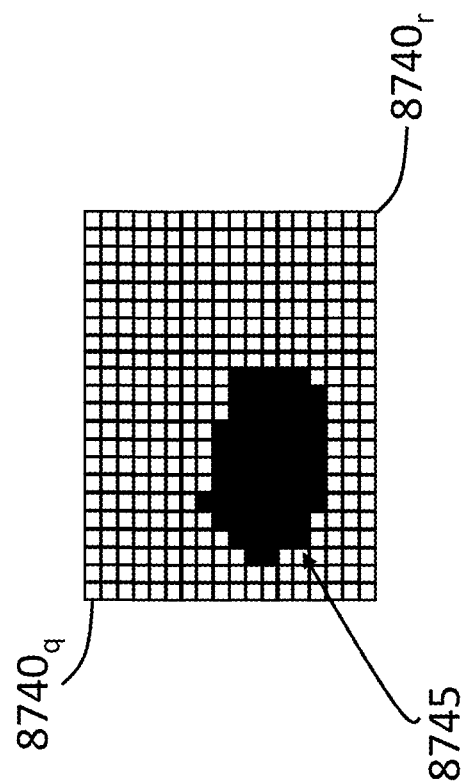

As stated above, the computing system 1100 may in an embodiment identify a surface region that satisfies a defined smoothness condition by identifying, from a plurality of 2D patches (e.g., $\mathbf{8740}_1$ through $\mathbf{8740}_n$), a set of contiguous 2D patches which satisfy a defined orientation similarity criterion and a defined depth similarity criterion. In such an embodiment, the defined orientation similarity criterion and/or the defined depth similarity criterion may be part of the defined smoothness condition, such that satisfying the defined smoothness condition includes satisfying the defined depth similarity criterion and/or the defined depth similarity criterion. More particularly, a set of contiguous 2D patches in this embodiment may satisfy the defined smoothness condition if they satisfy the defined orientation similarity criterion and the depth similarity criterion. As an example, FIG. 8D illustrates a set 8745 of contiguous 2D patches that satisfy the depth similarity criterion and the defined depth similarity criterion. The set 8745 of contiguous 2D patches in FIG. 8D may, e.g., encompass the 2D patches $\mathbf{8740}_p$ through $\mathbf{8740}_{p+5}$ of FIG. 8C. As discussed in more detail below, the set of contiguous 2D patches (e.g., 8745) may be used to form or define the surface region (e.g., 6810) that satisfies the defined smoothness condition, and thus may be used to form the grip region discussed above.

In an embodiment, a set of 2D patches may define a local region that is spatially contiguous, wherein no portion of the local region is completely isolated from any other portion of the local region. The set of 2D patches may be contiguous if each 2D patch of the set of 2D patches is directly or indirectly connected to every other 2D patch in the set of 2D patches. In this embodiment, a first 2D patch and a second 2D patch may be directly connected and contiguous with each other if they share a common border, have some overlap, or are immediately adjacent neighbors. More specifically, the first 2D patch and the second 2D patch may be directly connected and contiguous with each other if they share locations that were used to perform the plane fitting to determine the 2D patches. For example, the 2D patch $\mathbf{8740}_p$ and the 2D patch $\mathbf{8740}_{p+1}$ in FIG. 8C share five common locations which are used to determine both the 2D patch $\mathbf{8740}_p$ and the 2D patch $\mathbf{8740}_{p+1}$. In other words, there is an overlap in the locations used to determine the 2D patch $\mathbf{8740}_p$ and in the locations used to determine the 2D patch $\mathbf{8740}_{p+1}$. As a result, the 2D patch $\mathbf{8740}_p$ and the 2D patch $\mathbf{8740}_{p+1}$ may be considered to be directly connected and contiguous with each other.

Further, a first 2D patch and a second 2D patch may be considered to be indirectly connected if there is an intermediate patch or intermediate patches in the set of 2D patches which connect the first 2D patch and the second 2D patch. For instance, the 2D patch $\mathbf{8740}_{p+1}$ in FIG. 8C may be an intermediate patch that indirectly connects the 2D patch $\mathbf{8740}_p$ and the 2D patch $\mathbf{8740}_{p+2}$. As another example, the 2D patches $\mathbf{8740}_{p+3}$ and $\mathbf{8740}_{p+4}$ may be intermediate patches that indirectly connect the 2D patch $\mathbf{8740}_p$ and the 2D patch $\mathbf{8740}_{p+5}$. In one example, the intermediate patches may themselves be contiguous, and may, e.g., share one border with the first 2D patch, and share another border with the second 2D patch. More particularly, one of the intermediate patches may be directly connected to the first 2D patch, and another one of the intermediate patches may be directly connected to the second 2D patch.

Figure 8E:
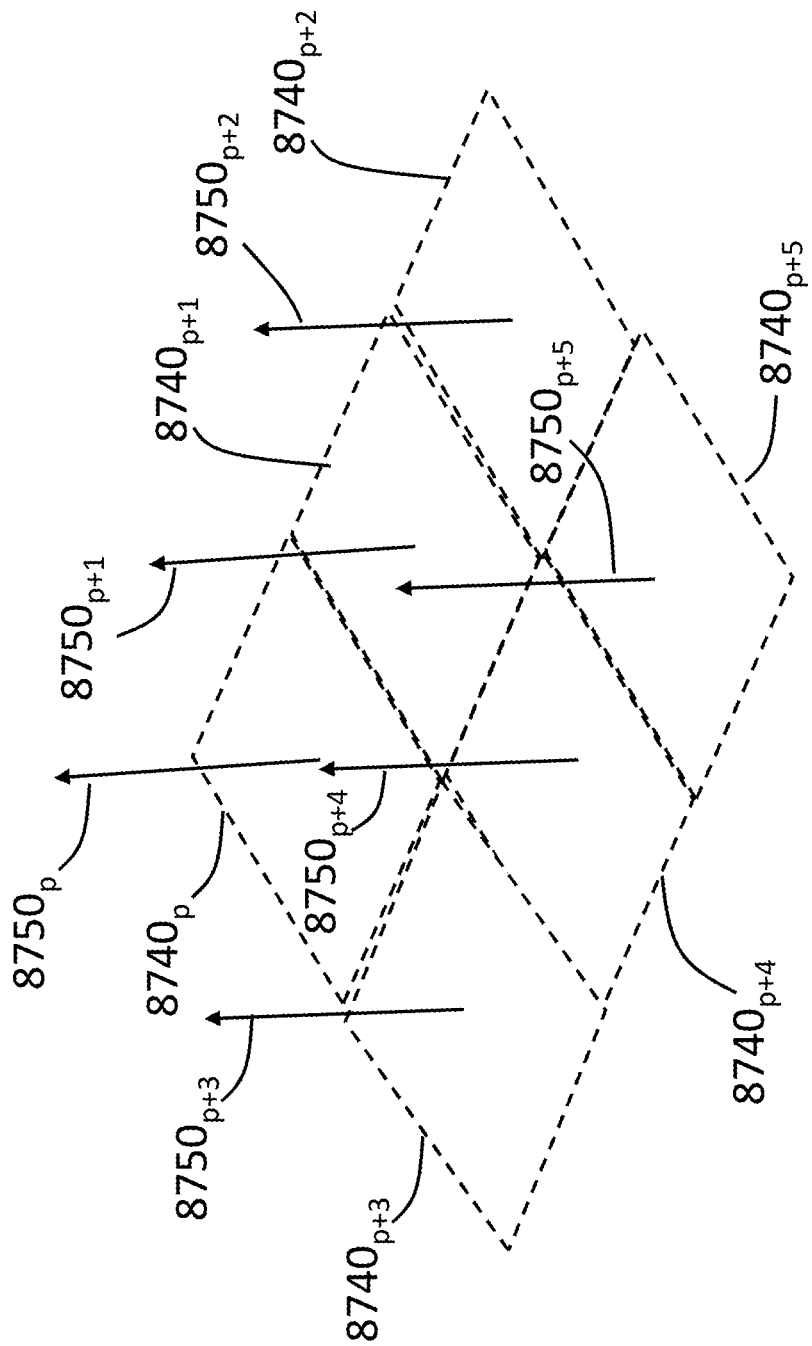

In an embodiment, orientation of a set of 2D patches may be defined by respective normal vectors of those 2D patches, and the orientation similarity criterion may involve the normal vectors being sufficiently similar to each other. For example, FIG. 8E depicts normal vectors $8750_p$ through $8750_{p+5}$ for the 2D patches $8740_p$ through $8740_{p+5}$, respectively, wherein each normal vector may be a vector that is perpendicular to a respective 2D patch. In such an embodiment, the orientation similarity criterion for a first 2D patch (e.g., $8740_p$) and a second 2D patch (e.g., $8740_{p+1}$) may involve their normal vectors being sufficiently similar to each other. For example, the computing system may determine a first normal vector (e.g., $8750_p$), which is a vector perpendicular to the first 2D patch (e.g., $8740_p$), and may determine a second normal vector (e.g., $8750_{p+1}$), which may be a vector perpendicular to the second 2D patch (e.g., $8740_{p+1}$). The computing system 1100 in this example may determine whether the first 2D patch (e.g., $8740_p$) and the second 2D patch ($8740_{p+1}$) satisfy the defined orientation similarity criterion by determining whether the first normal vector (e.g., $8750_p$) and the second normal vector (e.g., $8750_{p+1}$) satisfy the defined orientation similarity criterion. The first normal vector and the second normal vector may satisfy the defined orientation similarity criterion when, e.g., an angle between the first normal vector and the second normal vector is below a defined angle threshold, and/or when a dot product between the first normal vector and the second normal vector is above a defined dot product value threshold. In the example of FIG. 8D, the computing system 1100 may further determine whether the defined orientation similarity criterion is satisfied for a larger group of 2D patches, such as 2D patches $8740_p$ through $8740_{p+}5$. For instance, the computing system 1100 may determine that the defined orientation similarity criterion is satisfied for the 2D patches $8740_p$ through $8740_{p+5}$ if, for each of the 2D patches, a normal vector of the 2D patch is within the defined angle threshold relative to a normal vector of an immediately adjacent neighboring patch.

Figure 8F:
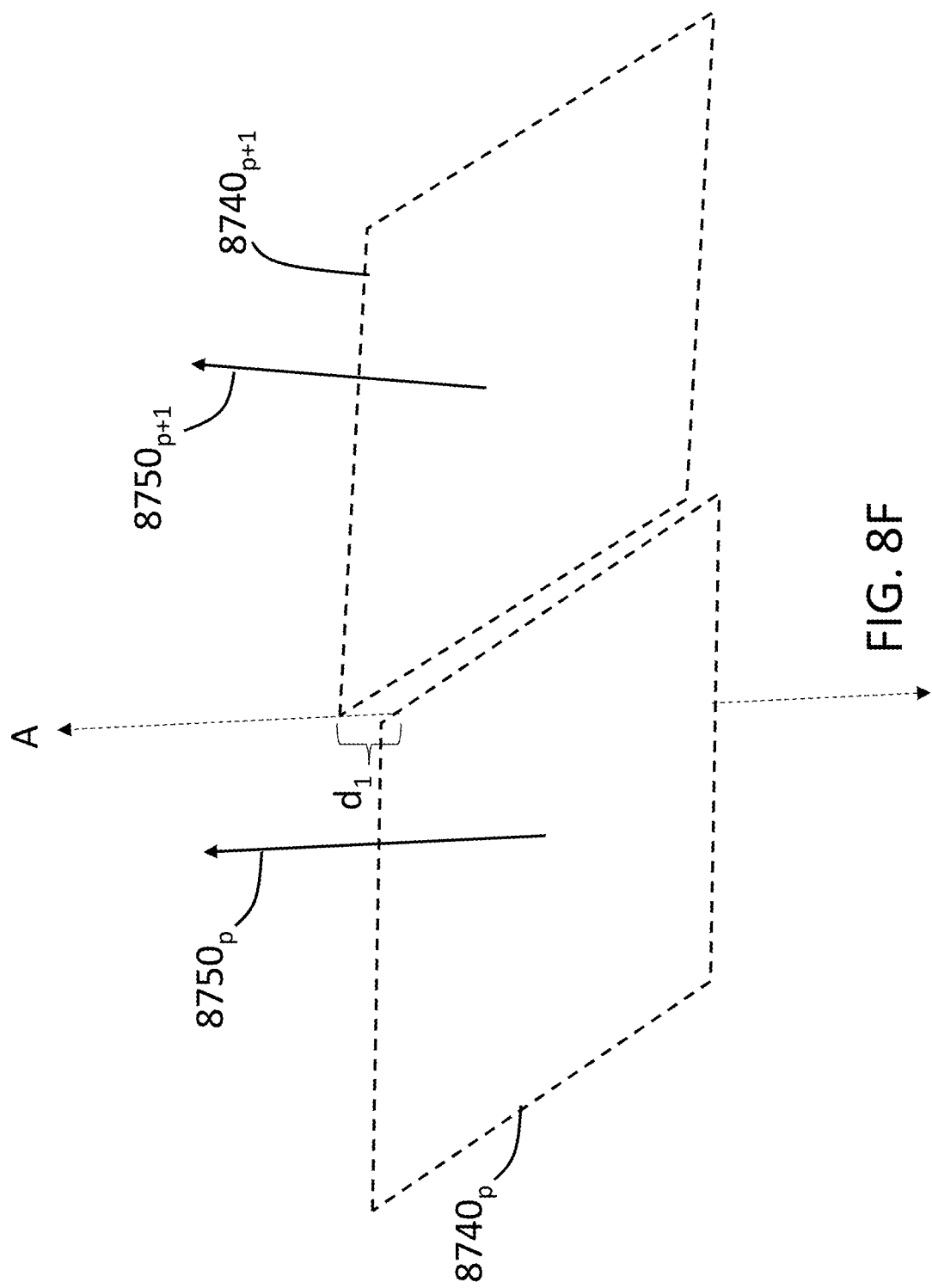
Figure 8G:
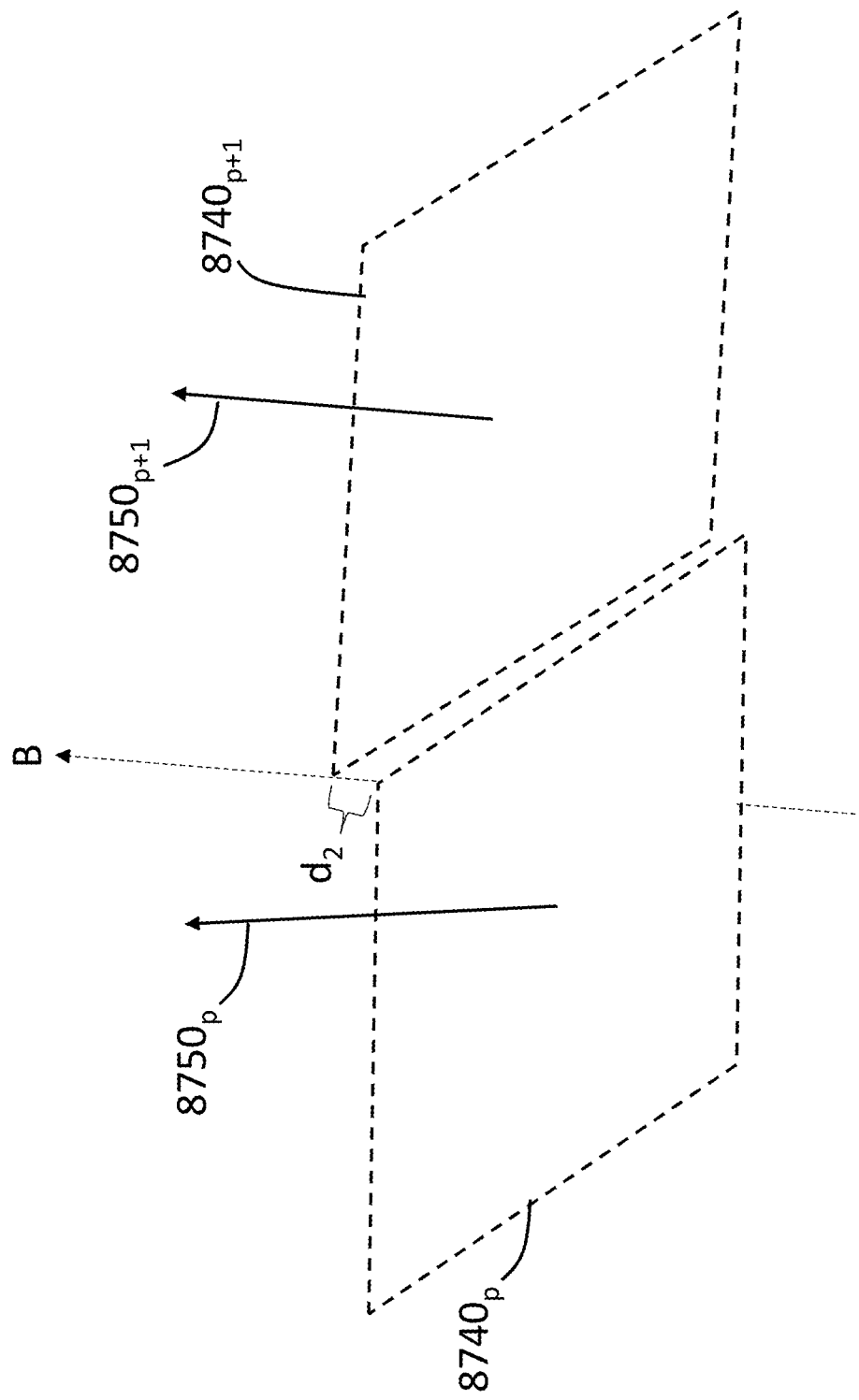

In an embodiment, the defined depth similarity criterion may involve whether one or more distances between 2D patches, as measured along a depth dimension, are sufficiently small. For example, the computing system 1100 may determine whether the defined depth similarity criterion is satisfied for a first 2D patch (e.g., the 2D patch $8740_p$ in FIGS. 8F and 8G), and a second 2D patch (e.g., $8740_{p+1}$) by determining whether a first distance between the first 2D patch and the second 2D patch satisfies the defined depth similarity criterion, and/or whether a second distance between the them satisfies the defined depth similarity criterion. More specifically, the computing system 1100 may determine that the depth similarity criterion is satisfied for the first 2D patch and the second 2D patch if the first distance and/or the second distance is below a defined distance threshold. The first distance, such as distance $d_1$ in FIG. 8F, may be a distance from the first 2D patch (e.g., $8740_p$) to the second 2D patch (e.g., $8740_{p+1}$) along an axis A perpendicular to a first normal vector (e.g., $8750_p$), which may be a vector perpendicular to the first 2D patch (e.g., $8740_p$). The second distance, such as distance $d_2$ in FIG. 8F, may be a distance from the first 2D patch (e.g., $8740_p$) to the second 2D patch (e.g., $8740_{p+1}$) along an axis B perpendicular to a second normal vector (e.g., $8750_{p+1}$), which may be a vector perpendicular to the second 2D patch (e.g., $8740_{p+1}$). In an embodiment, the computing system 1100 may determine that a group of 2D patches, such as 2D patches $8740_p$ through $8740_{p+5}$, satisfy the defined depth similarity criterion if, for each of the 2D patches, one or more distances between the 2D patch and an immediately adjacent neighboring 2D patch is less than the defined distance threshold. In this embodiment, the one or more distances may include the first distance and the second distance discussed above, which are measured along respective normal vectors of the two patches.

As stated above, the computing system may in some implementations determine a set of contiguous 2D patches that satisfy the defined orientation similarity criterion and the defined depth similarity criterion, so as to determine a surface region (e.g., 6810 of FIGS. 6 and 9A or 6812 of FIG. 9B) which satisfies the defined smoothness condition. More particularly, the surface region may be used as a grip region, and may be formed by or may fit within a local region defined by the set of contiguous 2D patches.

In an embodiment, the computing system 1100 may identify the set of contiguous 2D patches (e.g., 8745) by identifying an initial set of one or more 2D patches, and expanding the initial set of one or more 2D patches into the set of contiguous 2D patches. As an example, the computing system 1100 may use the 2D patch $8740_p$ of FIGS. 8B, 8C, and 8E to form an initial set of a single 2D patch. In this example, the single 2D patch $8740_p$ may be used as a seed that is expanded into the set 8745 of contiguous patches of FIG. 8D.

In an embodiment, the computing system 1100 may be configured to include, in the initial set of one or more 2D patches, a 2D patch (e.g., $8740_p$) that is considered by the computing system 1100 to be at or to represent a smoothest location or group of locations across a particular region. In one example, the particular region may be a local region that encompasses the 2D patch, such as a particular quadrant of a scene represented by the image information of step 4002. In one example, the particular region may be an entirety of the scene represented by the image information. In this example, the 2D patch that is included in the initial set of one or more 2D patches may represent a smoothest location or group of locations among the plurality of locations (e.g., $5700_1$-$5700_n$) represented by the image information. The group of locations in this example may be a cluster of locations, such as the 5×5 grid of locations bounded by corner locations corner locations $5700_{[kx, ky]}$, $5700_{[kx+4, ky]}$, $5700_{[kx, ky+4]}$, and $5700_{[kx+4, ky+4]}$ in FIG. 8C.

In an embodiment, the computing system 1100 may determine a plurality of smoothness scores that indicate respective degrees of smoothness across one or more surfaces represented by the image information, wherein the one or more surfaces may include one or more object surfaces (e.g., respective object surfaces for objects $3520_1$, $3520_2$, etc.). More particularly, the plurality of smoothness scores may indicate respective degrees of smoothness at the plurality of locations (e.g., $5700_1$-$5700_n$) represented by the image information. As stated above, the computing system 1100 may include, in the initial set of one or more 2D patches, a 2D patch which represents a smoothest location or group of locations across a local region or across an entirety of the scene represented by the image information. In this embodiment, this 2D patch may represent a location having a highest smoothness score among the plurality of smoothness scores. In some instances, the plurality of smoothness scores may form a smoothness map which measures smoothness across a scene represented by the image information. In such instances, the 2D patch included in the initial set may have a highest smoothness score across the entire smoothness map, or across a local region of the smoothness map (e.g., a local quadrant of the smoothness map).

As stated above, the computing system 1100 may attempt to expand the initial set of one or more 2D patches into the set of contiguous 2D patches. The initial set may include, e.g., a single 2D patch (e.g., $8740_p$) or multiple 2D patches that are contiguous with each other (e.g., $8740_p$ and $8740_{p+1}$), and may act as a seed which is expanded into the set of contiguous 2D patches. More specifically, the initial set may be an initial version of the set of contiguous 2D patches. The computing system 1100 may add one or more 2D patches to this initial version of the set of contiguous 2D patches to generate an updated version. In the example of FIG. 8D, the set 8745 of contiguous patches may be, e.g., a final version of a set of contiguous 2D patches. The final version may be, e.g., a largest possible set of contiguous 2D patches which the computing system 1100 is able to identify that satisfy the defined smoothness condition, or more specifically the defined orientation similarity criterion and the defined depth similarity criterion, and that was expanded from the initial set of one or more 2D patches (e.g., expanded from 87400. In this example, the computing system 1100 may stop attempting to expand the set of contiguous 2D patches when it is unable to identify any additional 2D patch in the plurality of 2D patches (e.g., $8740_1$-$8740_n$) which is both contiguous with an existing 2D patch in the set and satisfies the orientation similarity criterion and depth similarity criterion with respect to the existing 2D patch.

As an example of the expansion, the computing system 1100 may search for a 2D patch which is: (i) not currently in the set of contiguous 2D patches, or more specifically is not in a current version of set of contiguous 2D patches, (ii) is contiguous with at least one 2D patch that is in the current version of the set of contiguous 2D patches, and (iii) satisfies the defined orientation similarity criterion and defined depth similarity criterion with respect to the at least one 2D patch. If the computing system 1100 is able to identify such a 2D patch which satisfy the above criteria, it may add the 2D patch to the current version of the set of contiguous 2D patches to generate an updated version of the set. For instance, if the initial set of one or more 2D patches includes a first 2D patch (e.g., $8740_p$ of FIG. 8C) of the plurality of patches (e.g., $8740_1$ to $8740_n$) discussed above, the computing system 1100 may use the initial set as an initial version of the set of contiguous 2D patches. The computing system 1100 may expand this initial version by identifying, from among the plurality of 2D patches, a second 2D patch (e.g., $8740_{p+1}$ or $8740_{p+3}$) which is contiguous with the first 2D patch and which is currently not in the initial set. The computing system may further determine whether the first 2D patch (e.g., $8740_p$) and the second 2D patch (e.g., $8740_{p+1}$ or $8740_{p+3}$) satisfy the defined orientation similarity criterion and the defined depth similarity criterion. The computing system 1100 may, in response to a determination that the above criteria are satisfied, add the second 2D patch to the initial set to generate an expanded set of 2D patches. The expanded set may be an updated version of the set of contiguous 2D patches. In some instances, the expanded set may form a final version of a set of contiguous 2D patches, such as the set 8745 of contiguous 2D patches of FIG. 8D. In some instances, the expanded set may be an intermediate version of the set of contiguous 2D patches, wherein the intermediate version may form a part of the final version of the set of contiguous 2D patches.

In an embodiment, determining whether the first 2D patch (e.g., $8740_p$) and the second 2D patch (e.g., $8740_{p+1}$) satisfy the defined orientation similarity criterion may involve comparing a normal vector (e.g., $8750_p$) of the first 2D patch and a normal vector (e.g., $8750_{p+1}$) of the second 2D patch, and determining whether the two normal vectors satisfy the defined orientation similarity criterion, as discussed above with respect to FIG. 8E. In an embodiment, determining whether the first 2D patch (e.g., $8740_p$) and the second 2D patch (e.g., $8740_{p+1}$) satisfy the defined depth similarity criterion may involve determining whether one or more distances between the 2D patches satisfy the defined depth similarity criterion. The one or more distances may include a first distance (e.g., $d_1$) that is measured along an axis parallel with the normal vector of the first 2D patch, and a second distance (e.g., $d_2$) that is measured along an axis parallel with the normal vector of the second 2D patch, as discussed above with respect to FIGS. 8F and 8G. The computing system 1100 may determine that the first 2D patch and the second 2D patch satisfy the defined depth similarity criterion if, e.g., at least one of the first distance or the second distance satisfies the defined depth similarity criterion.

In an embodiment, if the expanded set discussed above is an intermediate version of the set of contiguous 2D patches, the computing system 1100 may attempt to update the expanded set. The expansion may be performed by searching for one or more remaining 2D patches (e.g., $8740_{p+2}$) that are contiguous with at least one 2D patch (e.g., $8740_{p+1}$) currently in the expanded set and that satisfy the defined orientation similarity criterion and the defined depth similarity criterion with respect to the at least one 2D patch. The search may be made from among the plurality of 2D patches (e.g., $8740_1$-$8740_n$) discussed above. The computing system 1100 may update the expanded set by adding the one or more remaining 2D patches to the expanded set.

Figure 9A:
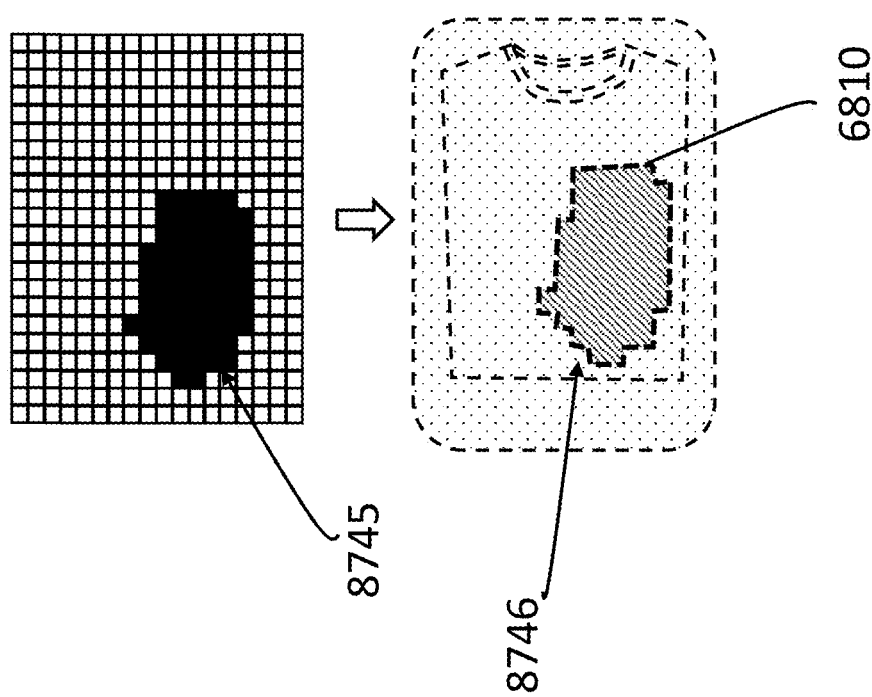

In an embodiment, the computing system 1100 may use the set of contiguous 2D patches to form or identify a surface region that may be used as a grip region. In other words, the surface region which is identified as the grip region may be formed by and/or fit within the set of contiguous 2D patches. More particularly, the set of contiguous 2D patches may satisfy a defined smoothness condition, because the 2D patches in the set may satisfy the defined orientation similarity criterion and the defined depth similarity criterion. The computing system 1100 may define the grip region as a surface region which fits within a border of the set of contiguous 2D patches. In some instances, this surface region may have the same shape as the set of contiguous 2D patches. In some instances, this surface region may have a defined region shape (e.g., rectangular shape, circular shape, or elliptical shape) that fits within the set of contiguous 2D patches. As an example, FIG. 9A depicts an implementation in which the computing system 1100 identifies the grip region as a surface region 6810 that fits within the set 8745 of contiguous 2D patches. In this example, the computing system 1100 may define the surface region 6810 to have a border which is identical or substantially identical to a border 8746 formed by the set 8745 of contiguous 2D patches. FIG. 9B depicts an example in which the computing system 1100 identifies the grip region as a surface region 6812 that has a defined shape. More particularly, the surface region 6812 may be a rectangular region that fits within the border 8746 of the set 8745 of contiguous 2D patches.

As stated above, the surface region 6810 or surface region 6812 may be identified as a grip region, which may be a detection result that is output by a gripping region detection operation, or more specifically by the grip region detection module 1127 of FIG. 2C. The detection result may be provided as an input to, e.g., a motion planning operation, which may be performed by, e.g., the motion planning module 1129.

Figure 10:
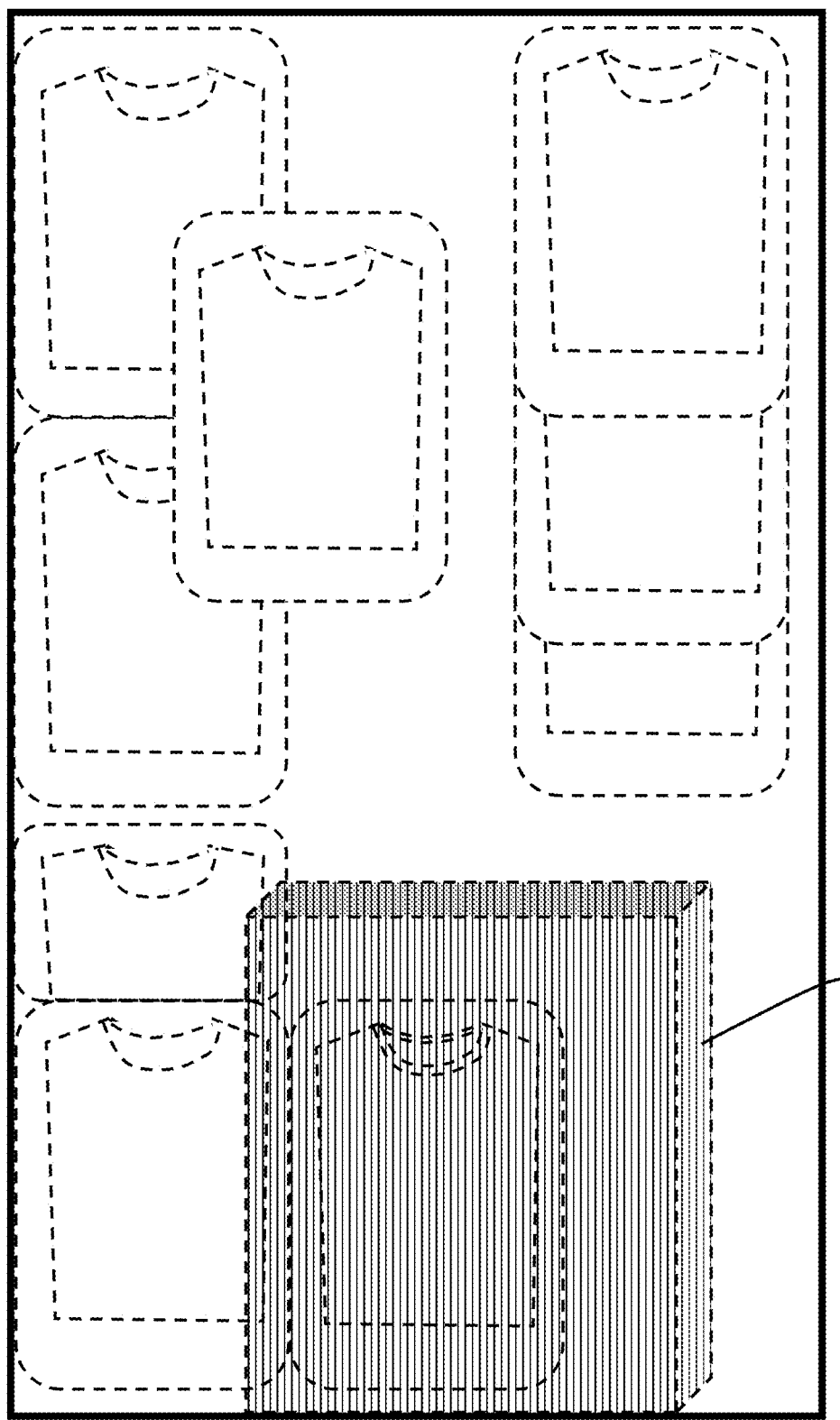
FIG. 10 illustrates a 3D region that is identified as a safety region, according to an embodiment hereof.
Figure 11A:
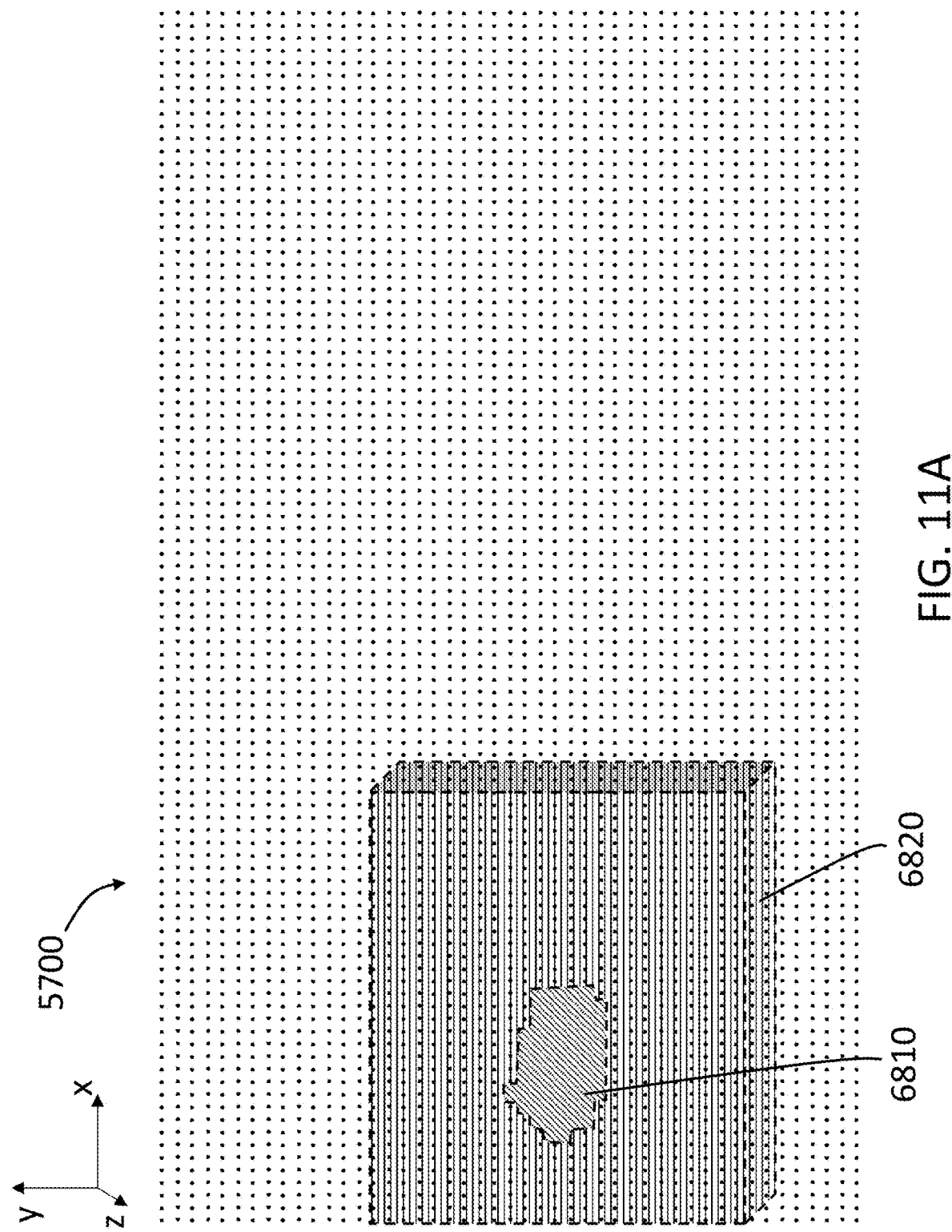
FIGS. 11A and 11B illustrate various aspects of identifying a safety region, according to an embodiment hereof.
Figure 11B:
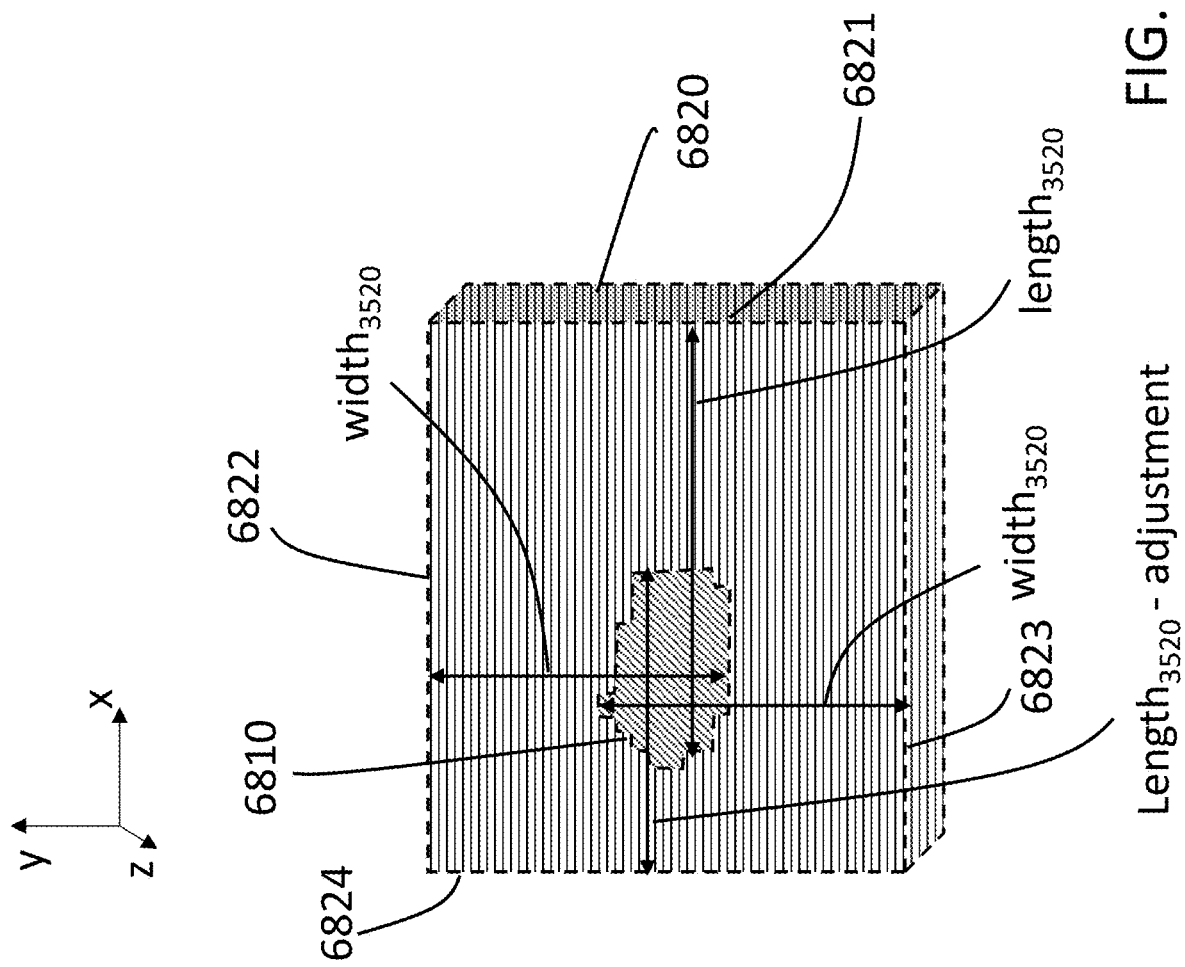
Figure 12A:
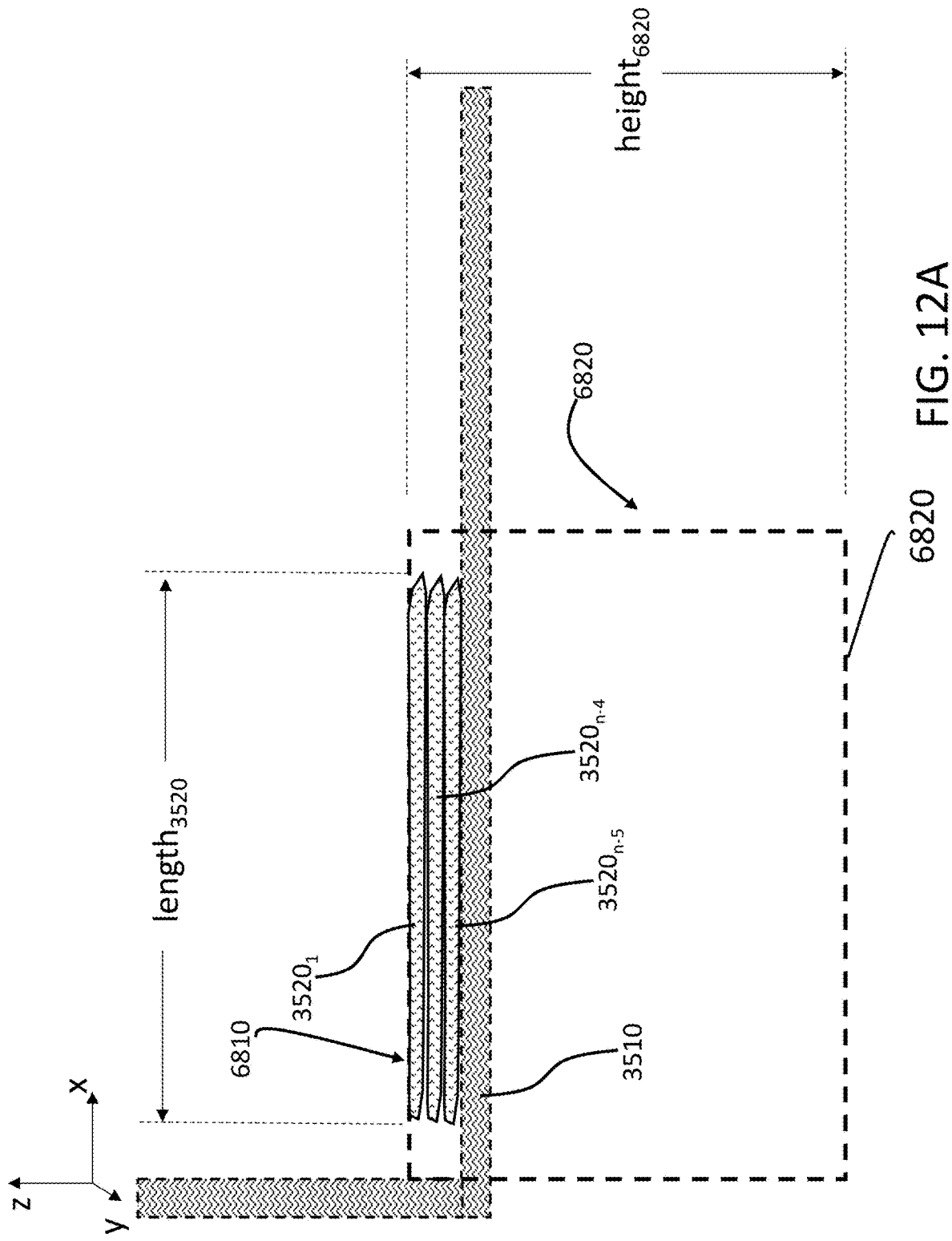
FIGS. 12A and 12B illustrate various aspects of identifying a safety region or of motion planning based on the safety region, according to an embodiment hereof.
Figure 12B:
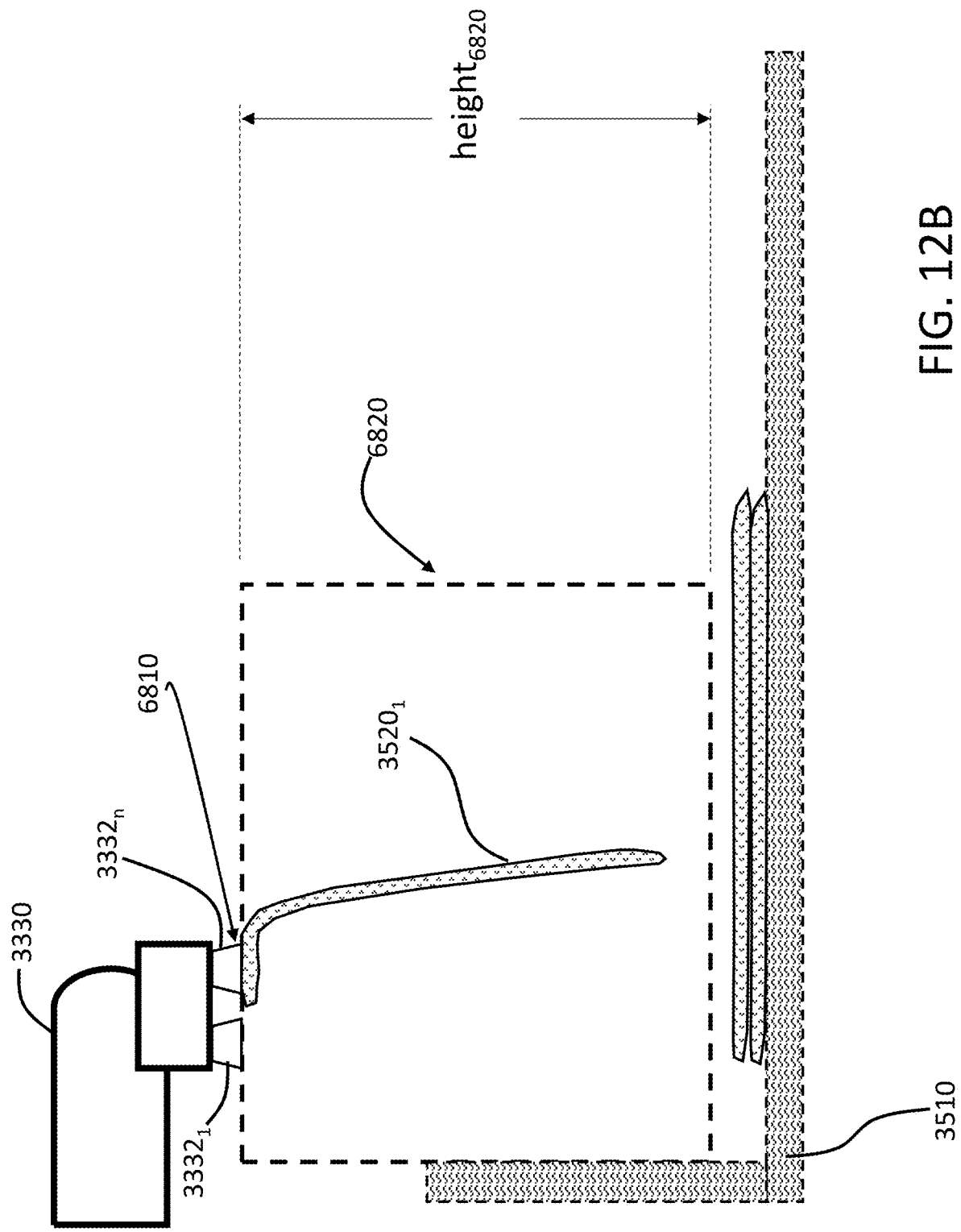

Returning to FIG. 4, the method 4000 may in an embodiment include a step 4006, in which the computing system 1100 may identify a safety region (also referred to as a safety volume), which may be a three-dimensional (3D) region that surrounds the grip region in one or more horizontal dimensions. The one or more horizontal dimensions (e.g., a X-dimension and/or Y-dimension) may be parallel with ground, and/or perpendicular to a depth dimension, wherein the depth dimension may be, e.g., a vertical dimension parallel with an axis of gravity. For example, FIGS. 10, 11A, and 11B illustrate a 3D region 6820 which the computing system may identify as a safety region. The 3D region 6820 may extend in, e.g., the X-dimension and the Y-dimension. As illustrated in FIG. 11A, the 3D region 6820 or other safety region may surround a grip region, such as the surface region 6810 in two horizontal dimensions. In some implementations, the safety region may extend along a vertical dimension that is perpendicular to the one or more horizontal dimensions. For instance, the 3D region 6820 that forms a safety region may be a rectangular region that extends along a vertical dimension (e.g., Z-dimension), in a downward direction from the surface region 6810, as illustrated in FIGS. 12A and 12B (which further illustrate objects $3520_{n-5}$ and $3520_{n-4}$). In some instances, the safety region may be defined to completely encompass the surface region 6810, such that no portion of the surface region 6810 extends beyond a top surface or any other surface of the safety region in the Z-dimension. In some instances, the surface region 6810 may have one or more portions that protrude beyond a surface of the safety region.

As discussed below in more detail, the safety region, which may also be an output of the gripping region detection operation, may be used during motion planning, or more specifically robot motion planning, for gripping an object (e.g., $3520_1$) associated with a grip region. More particularly, use of the safety region may reduce a chance of collision between the object and another object or structure in a robot's environment. In some instances, the safety region may provide a safety margin around the object, so that the computing system 1100 takes the safety margin into account when planning movement for gripping and moving an object (e.g., $3520_1$). For example, the motion planning may involve determining a movement path for an end effector apparatus (e.g., 3330) to follow after it has gripped an object at a grip region, wherein the end effector apparatus causes the grip region and the object to follow substantially the same movement path. The safety region, which surrounds the grip region, may in this example be large enough to also surround the object in one or more horizontal dimensions so as to provide the safety margin. The computing system 1100 may determine the movement path so as to avoid collision between the safety region (which surrounds the grip region) and structures such as container walls, electrical wiring, and other objects in the robot's environment. Such a form of motion planning may, e.g., cause the end effector apparatus to move in a more conservative fashion, such as by keeping a larger distance between the object and other objects or structures which may fall near the object's movement path, so as to further reduce the chance of collision between the object and those other objects or structures.

As stated above, the safety region, which surrounds the grip region, may in an embodiment be large enough to further surround, in one or more horizontal dimensions, an object associated with the grip region. More particularly, the safety region may be large enough so that it extends from the grip region beyond a border of the object, such that the border of the object is encompassed by a border of the safety region in one or more horizontal dimensions. In an embodiment, the border of the safety region may include one or more edges, and the computing system 1100 may determine at least one edge of the safety region based on a defined lateral dimension size. The defined lateral dimension size may be a defined size of a lateral dimension of an object (also referred to as an object lateral dimension). The lateral dimension of an object may be a dimension that is perpendicular to a thickness dimension of the object. For instance, a rectangular-shaped object may have lateral dimensions that include a length dimension and a width dimension, while a disk-shaped object may have a lateral dimension that is a radial dimension. As an example, FIG. 11B depicts a first defined lateral dimension size, $length_{3520}$, which may be a defined size of a length dimension for an object (e.g., $3520_1$) or group of objects. FIG. 11B further depicts a second defined lateral dimension size, $width_{3520}$, which may be a defined size of a width dimension for the object or group of objects. The defined sizes may be, e.g., predefined and stored in the non-transitory computer-readable medium 1120.

As stated above, the defined lateral dimension size may be associated with an object or a group of objects. More specifically, the computing system 1100 may in an embodiment be operating in a scenario in which a robot (e.g., 3300) is expected to be gripping and moving objects (e.g., $3520_1$-$3520_n$) that have the same size or substantially the same size, or is expected to be gripping only a single object (e.g., $3520_1$). For instance, the robot may be expected to be lifting a package of clothing from a bin which contains only a group of identical packages of clothing. The group of packages may be, e.g., associated with the same stock keeping unit (SKU) number.

In the above embodiment, the computing system 1100 may use a defined lateral dimension size, such as a defined object length or defined object width, that is associated with the group of packages, or more generally group of objects, to determine an edge of the safety region. More specifically, the group of objects may share one or more defined lateral dimension sizes, such as $length_{3520}$ and $width_{3520}$ in FIG. 11B. The computing system 1100 may expect that an object associated with a grip region (e.g., surface region 6810/6812), such as object $3520_1$, will have an edge which does not extend by more than the defined lateral dimension size from the grip region. More particularly, the object $3520_1$ associated with the surface region 6810 in FIG. 11B may have an object surface that extends from the surface region 6810 or other grip region along a first dimension (e.g., length dimension) by a distance that is less than or equal to $length_{3520}$, that extends along a second dimension (e.g., width dimension) by a distance that is less than or equal to $width_{3520}$. If the computing system sets at least one edge (e.g., 6821) of the safety region 6820 to be located beyond the surface region 6810 by a distance equal to $length_{3520}$ and sets at least another edge (e.g., 6822/6823) of the safety region 6820 to be located beyond the surface region 6810 by a distance equal to $width_{3520}$, such a safety region 6820 may be more likely to surround the object (e.g., $3520_1$) associated with the surface region 6810 (which is the grip region in this example). Thus, in this example, the computing system may determine an edge of a safety region based on a defined lateral dimension size associated with a lateral dimension of an object.

In an embodiment, an edge of a safety region may be determined based on a maximum lateral dimension size for a group of objects. Such an embodiment may involve a scenario in which a robot is expected to grip and move a group of objects that have different respective lateral dimension sizes. For instance, the robot may be expected to lift a package of clothing from a bin which may contain a group of packages associated with different SKU numbers and with different object lengths and/or different object widths. In such an embodiment, the computing system 1100 may use a maximum lateral dimension size, such as a defined maximum object length or a defined maximum object width among the group of objects, to determine an edge of the safety region. For example, the computing system may determine a safety region to have one edge or one pair of edges which are located beyond a grip region by a distance equal to a first defined maximum lateral dimension size (e.g., a defined maximum object length), and may determine the safety region to have another edge or another pair of edges which are located beyond the grip region by a distance equal to a second defined maximum lateral dimension size (e.g., a defined maximum object width).

In an embodiment, the computing system 1100 may determine an edge of the safety region to be located at a container wall of a container in which an object is disposed. For instance, the image information 5700 (e.g., point cloud) in FIG. 11A may describe depth information for locations on one or more surfaces within a container, such as the container 3510 of FIGS. 3A-3C. In such an instance, the computing system 1100 may expect that an object (e.g., $3520_1$) disposed in the container will not extend past a container wall, which may form an edge of the container. Thus, the safety region may does not need to extend past the container wall to still surround an object (e.g., $3520_1$) in the container (e.g., 3510). Thus, as illustrated in FIG. 11B, the computing system 1100 may determine an edge 6824 of the 3D region 6820 (which is the safety region in this example) to be at a location associated with a container wall of the container 3510. As illustrated in FIG. 11B, a location of the edge 6824 may have a distance from the grip region (e.g., surface region 6810) that is less than a defined lateral dimension size (e.g., $length_{3520}$). In this example, the computing system 1100 may detect the container wall by detecting, e.g., a sharp change in depth in the image information 5700, or detecting an end of the image information 5700. Thus, in the embodiment of FIG. 11B, the computing system may identify the safety region (e.g., 3D region 6820) as a region which extends in one or more horizontal dimensions to at least one of: (i) a location associated with a container wall, such as a location defining edge 6824, or (ii) a location which extends from a grip region by a defined lateral dimension size (e.g., $length_{3520}$ or $width_{3520}$) along a horizontal dimension (e.g., length dimension or width dimension), such as a location defining edge 6821/6822/6823.

In an embodiment, the computing system 1100 may determine a height of the safety region, such as $height_{6820}$ in FIG. 12A. The height of the safety region (also referred to as safety region height) may be based on a defined lateral dimension size (e.g., $length_{3520}$) associated with an object, or a maximum lateral dimension size associated with a group of objects. As an example, the computing system 1100 may set or otherwise determine $height_{6820}$ to be equal or substantially equal to $length_{3520}$. In such an embodiment, the object (e.g., $3520_1$) associated with the defined lateral dimension size may be a flexible object that sags upon being lifted. For instance, FIG. 12B illustrates the object $3520_1$, such as a package of clothing, sagging when lifted by the end effector apparatus 3330, or more specifically by a suction cup $3332_n$ thereof. If the safety region is used for motion planning, determining a height of the safety region in such a manner may cause the motion planning to take into account a tendency of the object to sag under its own weight when being lifted. As a result, the motion planning may reduce a likelihood of collision between the object and another object or structure.

Returning to FIG. 4, the method 4000 may in an embodiment include a step 4008, in which the computing system 1100 performs robot motion planning based on the grip region (e.g., surface region 6810/6812) and the safety region (e.g., 3D region 6820). The robot motion planning may be for gripping of an object (e.g., $3520_1$) at the grip region by an end effector apparatus (e.g., 3330). As stated above, the object may in some instances be a flexible object. In an embodiment, the robot motion planning may involve generating or otherwise determining a trajectory along which the grip region is to be moved by the end effector apparatus. For instance, the computing system 1100 may determine a trajectory in which the end effector apparatus (e.g., $3520_1$) approaches and make contact with the grip region, so as to engage the grip region. Engaging the grip region may cause the end effector apparatus to grip the object (e.g., $3520_1$) at the grip region. The trajectory may further include the end effector apparatus lifting the object, and moving the object to a destination location. The robot motion planning may be performed in a manner that avoids the safety region coming into contact with other objects or structures in an environment of the end effector apparatus, so as to reduce a risk of collision between the gripped object and the other objects or structures in the environment of the end effector apparatus.

As an example, if the object (e.g., $3520_1$) is disposed within a container (e.g., 3510), the robot motion planning may seek to avoid collision between the object (e.g., $3520_1$) and a structure such as the container wall. In this example, the computing system 1100 may determine whether the trajectory discussed above causes the safety region, such as the 3D region 6820 that surrounds the object $3520_1$, to overlap with a portion of the container 3510 when the safety region follows the grip region (e.g., surface region 6810) along the trajectory. As stated above, the object may in some instances sag upon being lifted, as illustrated in FIG. 12B. If the end effector apparatus 3330 attempts to move such an object sideways before lifting the object to a sufficient height, a sagging portion of the object may collide with the container wall. The safety region may be used to take into account the possibility of such a collision. More specifically, the safety region may have a height (e.g., $h_{6820}$) that is based on a defined lateral dimension size, as discussed above. In such an example, a trajectory which would cause the sagging portion of the object to collide with the container wall may also cause the safety region to overlap with a portion of the container, such as the container wall. Thus, if the computing system 1100 determines that the trajectory causes the safety region (e.g., 6820) to overlap with a portion of the container, the computing system 1100 may generate an adjusted trajectory which causes the safety region, when following the grip region along the adjusted trajectory, to avoid the container (e.g., 3510). As a result, the use of the safety region may decrease a likelihood of collision between the gripped object (e.g., $3520_1$) and the container (e.g., 3510).

In an embodiment, one or more of the above steps may be repeated. For instance, the computing system 1100 may perform steps 4002-4008 to identify a first grip region and a first safety region, so as to facilitate robot movement which lifts a first object (e.g., $3520_1$) from a bin and delivers the first object to a destination location. The computing system 1100 in this embodiment may repeat steps 4004-4008 to identify a second grip region and a second safety region, so as to facilitate robot movement which lifts another object (e.g., $3520_2$) from the bin and delivers that other object to the destination location. In an embodiment, one or more steps may be omitted. For instance, the computing system 1100 may perform steps 4002-4006 without performing step 4008, or perform steps 4002 and 4004 without performing step 4006.

Additional Discussion of Various Embodiments:

Embodiment 1 relates to a computing system comprising, and a method performed by the computing system, such as when the computing system executes instructions on a non-transitory computer-readable medium. The computing system may include a communication interface and at least one processing circuit. The communication interface is configured to communicate with a robot having an end effector apparatus, and with a camera having a camera field of view. The at least one processing circuit is configured, when a flexible object is in the camera field of view, to: receive image information that represents an object surface associated with the flexible object, wherein the image information is generated by the camera. The at least one processing circuit is further configured to identify, as a grip region, a surface region of the object surface that satisfies a defined smoothness condition and has a region size that is larger than or equal to a defined region size threshold, wherein the grip region is identified based on the image information; identify, as a safety region, a three-dimensional (3D) region which surrounds the grip region in one or more horizontal dimensions, and which extends from the grip region along a vertical dimension that is perpendicular to the one or more horizontal dimensions; and perform robot motion planning based on the grip region and the safety region, wherein the robot motion planning is for gripping of the flexible object at the grip region by the end effector apparatus.

Embodiment 2 includes the computing system of embodiment 1. In this embodiment, the defined region size threshold is a defined contact region size associated with contact between the end effector apparatus and the flexible object, such that the grip region is large enough to fit a contact region having the defined contact region size.

Embodiment 3 includes the computing system of embodiment 2. In this embodiment, the defined region size threshold is a defined suction cup size associated with an end effector suction cup.

Embodiment 4 includes the computing system of embodiment 1. In this embodiment, the defined region size threshold is a defined object size associated with the flexible object.

Embodiment 5 includes the computing system of any one of embodiments 1-4. In this embodiment, the at least one processing circuit is configured, when the flexible object has a thickness dimension and a lateral dimension perpendicular to the thickness dimension, to determine an edge of the safety region based on a defined lateral dimension size associated the lateral dimension for the flexible object.

Embodiment 6 includes the computing system of any one of embodiments 1-5. In this embodiment, the at least one processing circuit is configured, when the flexible object is one of a group of flexible objects that are in the camera field of view and that have different respective lateral dimension sizes, to determine an edge of the safety region based on a maximum lateral dimension size of the different respective lateral dimension sizes.

Embodiment 7 includes the computing system of any one of embodiments 1-6. In this embodiment, the at least one processing circuit is configured, when the flexible object is an object that sags upon being lifted, to determine a safety region height based on a defined lateral dimension size associated with the flexible object.

Embodiment 8 includes the computing system of embodiment 7. In this embodiment, the at least one processing circuit is configured, when the flexible object is disposed within a container, to perform the robot motion planning by: generating a trajectory along which the grip region of the object surface is to be moved by the end effector apparatus; determining whether the trajectory causes the safety region, when following the grip region along the trajectory, to overlap with a portion the container; and in response to a determination that the trajectory causes the safety region to overlap with a portion of the container, generating an adjusted trajectory which causes the safety region, when following the grip region along the adjusted trajectory, to avoid overlap with the container.

Embodiment 9 includes the computing system of any one of embodiments 1-8. In this embodiment, the at least one processing circuit is configured, when the image information includes a point cloud that describes depth information for locations on one or more surfaces within a container, to identify the safety region as a region which extends in the one or more horizontal dimensions to at least one of: (i) a location associated with a container wall, or (ii) a location which extends from the grip region by a defined lateral dimension size along a horizontal dimension of the one or more horizontal dimensions.

Embodiment 10 includes the computing system of any one of embodiments 1-9. In this embodiment, the at least one processing circuit is configured, when the image information describes depth information for a plurality of locations in the camera field of view, to identify the grip region by: determining a plurality of two-dimensional (2D) patches that approximate respective subsets of the plurality of locations, wherein the plurality of 2D patches represent the object surface; and identifying, from among the plurality of 2D patches, a set of contiguous 2D patches which satisfy a defined orientation similarity criterion and a defined depth similarity criterion, wherein the surface region identified as the grip region is formed by or fits within the set of contiguous 2D patches, and wherein satisfying the defined smoothness condition for the surface region includes satisfying the defined orientation similarity criterion and the defined depth similarity criterion for the set of contiguous 2D patches.

Embodiment 11 includes the computing system of embodiment 10. In this embodiment, the grip region has a defined region shape and fits within the set of contiguous 2D patches.

Embodiment 12 includes the computing system of embodiment 10 or 11. In this embodiment, the at least one processing circuit is configured to identify the set of contiguous 2D patches by: identifying an initial set of one or more 2D patches; and expanding the initial set of one or more 2D patches into the set of contiguous 2D patches.

Embodiment 13 includes the computing system of embodiment 12. In this embodiment, the initial set of one or more 2D patches includes a first 2D patch of the plurality of 2D patches, and wherein the at least one processing circuit is configured to expand the initial set of one or more 2D patches into the set of contiguous 2D patches by: determining a first normal vector, which is a vector perpendicular to the first 2D patch; identifying, from among the plurality of 2D patches, a second 2D patch that is contiguous with the first 2D patch and not in the initial set of one or more 2D patches; determining a second normal vector, which is a vector perpendicular to the second 2D patch; determining at least one of: (i) a first distance from the first 2D patch to the second 2D patch along an axis parallel with the first normal vector, or (ii) a second distance from the second 2D patch to the first 2D patch along an axis parallel with the second normal vector; determining whether the first normal vector and the second normal vector satisfy the defined orientation similarity criterion; determining whether at least one of the first distance or the second distance satisfies the defined depth similarity criterion; in response to a determination that the first normal vector and the second normal vector satisfy the defined orientation similarity criterion, and a determination that at least one of the first distance or the second distance satisfies the defined depth similarity criterion, adding the second 2D patch to the initial set to generate an expanded set of 2D patches, wherein the expanded set forms the set of contiguous 2D patches or forms part of the set of contiguous 2D patches.

Embodiment 14 includes the computing system of embodiment 13. In this embodiment, the at least one processing circuit is further configured to: search, among 2D patches of the plurality of 2D patches which are not currently in the expanded set of 2D patches, for one or more remaining 2D patches that: (i) are contiguous with a 2D patch which is currently in the expanded set and (ii) satisfy the defined orientation similarity criterion and defined depth similarity criterion with respect to the 2D patch in the expanded set; and updating the expanded set by adding the one or more remaining 2D patches thereto.

Embodiment 15 includes the computing system of any one of embodiments 12-14. In this embodiment, the at least one processing circuit is configured to include, in the initial set of one or more 2D patches, a 2D patch of the plurality of 2D patches that represents a smoothest location or group of locations among the plurality of locations that are represented by the image information.

Embodiment 16 includes the computing system of embodiment 15. In this embodiment, the at least one processing circuit is configured to determine a plurality of smoothness scores that indicate respective degrees of smoothness of across one or more object surfaces at respective locations represented by the image information, wherein the 2D patch included in the initial set of one or more 2D patches represents a location having a highest smoothness score among the plurality of smoothness scores.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
a communication interface configured to communicate with a robot having an end effector apparatus, and with a camera having a camera field of view;
at least one processing circuit configured, when a flexible object is in the camera field of view, to:
receive image information that represents an object surface associated with the flexible object, wherein the image information is generated by the camera;
identify, as a grip region, a surface region of the object surface that satisfies a defined smoothness condition and has a region size that is larger than or equal to a defined region size threshold, wherein the grip region is identified based on the image information;
identify, as a safety region, a three-dimensional (3D) region indicative of a sag portion of the flexible object outside of the grip region in one or more horizontal dimensions, and which extends from the one or more horizontal dimensions along a vertical dimension that is perpendicular to the one or more horizontal dimensions;
perform robot motion planning based on the grip region and the safety region, wherein the robot motion planning is for:
gripping of the flexible object at the grip region by the end effector apparatus, and
avoiding other objects in an environment with the robot; and
communicate commands to the robot to cause the robot to perform the planned motion.

2. The computing system of claim 1, wherein the defined region size threshold is a defined contact region size associated with contact between the end effector apparatus and the flexible object, such that the grip region is large enough to fit a contact region having the defined contact region size.

3. The computing system of claim 2, wherein the defined region size threshold is a defined suction cup size associated with an end effector suction cup.

4. The computing system of claim 1, wherein the defined region size threshold is a defined object size associated with the flexible object.

5. The computing system of claim 1, wherein the at least one processing circuit is configured, when the flexible object has a thickness dimension and a lateral dimension perpendicular to the thickness dimension, to determine an edge of the safety region based on a defined lateral dimension size associated the lateral dimension for the flexible object.

6. The computing system of claim 1, wherein the at least one processing circuit is configured, when the flexible object is one of a group of flexible objects that are in the camera field of view and that have different respective lateral dimension sizes, to determine an edge of the safety region based on a maximum lateral dimension size of the different respective lateral dimension sizes.

7. The computing system of claim 1, wherein the at least one processing circuit is configured, to determine a safety region height based on a defined lateral dimension size associated with the sag portion of the flexible object.

8. The computing system of claim 7, wherein the at least one processing circuit is configured, when the flexible object is disposed within a container, to perform the robot motion planning by:

generating a trajectory along which the grip region of the object surface is to be moved by the end effector apparatus;

determining whether the trajectory causes the safety region, when following the grip region along the trajectory, to overlap with a portion the container; and in response to a determination that the trajectory causes the safety region to overlap with a portion of the container, generating an adjusted trajectory which causes the safety region, when following the grip region along the adjusted trajectory, to avoid overlap with the container.

9. The computing system of claim 1, wherein the at least one processing circuit is configured, when the image information includes a point cloud that describes depth information for locations on one or more surfaces within a container, to identify the safety region as a region which extends in the one or more horizontal dimensions to at least one of: (i) a location associated with a container wall, or (ii) a location which extends from the grip region by a defined lateral dimension size along a horizontal dimension of the one or more horizontal dimensions.

10. The computing system of claim 1, wherein the at least one processing circuit is configured, when the image information describes depth information for a plurality of locations in the camera field of view, to identify the grip region by:

determining a plurality of two-dimensional (2D) patches that approximate respective subsets of the plurality of locations, wherein the plurality of 2D patches represent the object surface; and identifying, from among the plurality of 2D patches, a set of contiguous 2D patches which satisfy a defined orientation similarity criterion and a defined depth similarity criterion, wherein the surface region identified as the grip region is formed by or fits within the set of contiguous 2D patches, and wherein satisfying the defined smoothness condition for the surface region includes satisfying the defined orientation similarity criterion and the defined depth similarity criterion for the set of contiguous 2D patches.

11. The computing system of claim 10, wherein the grip region has a defined region shape and fits within the set of contiguous 2D patches.

12. The computing system of claim 10, wherein the at least one processing circuit is configured to identify the set of contiguous 2D patches by:

identifying an initial set of one or more 2D patches; and
expanding the initial set of one or more 2D patches into the set of contiguous 2D patches.

13. The computing system of claim 12, wherein the initial set of one or more 2D patches includes a first 2D patch of the plurality of 2D patches, and wherein the at least one processing circuit is configured to expand the initial set of one or more 2D patches into the set of contiguous 2D patches by:

determining a first normal vector, which is a vector perpendicular to the first 2D patch;

identifying, from among the plurality of 2D patches, a second 2D patch that is contiguous with the first 2D patch and not in the initial set of one or more 2D patches;

determining a second normal vector, which is a vector perpendicular to the second 2D patch;

determining at least one of: (i) a first distance from the first 2D patch to the second 2D patch along an axis parallel with the first normal vector, or (ii) a second distance from the second 2D patch to the first 2D patch along an axis parallel with the second normal vector;

determining whether the first normal vector and the second normal vector satisfy the defined orientation similarity criterion;

determining whether at least one of the first distance or the second distance satisfies the defined depth similarity criterion;

in response to a determination that the first normal vector and the second normal vector satisfy the defined orientation similarity criterion, and a determination that at least one of the first distance or the second distance satisfies the defined depth similarity criterion, adding the second 2D patch to the initial set to generate an expanded set of 2D patches, wherein the expanded set forms the set of contiguous 2D patches or forms part of the set of contiguous 2D patches.

14. The computing system of claim 13, wherein the at least one processing circuit is further configured to:

search, among 2D patches which are part of the plurality of 2D patches and which are not currently in the expanded set of 2D patches, for one or more remaining 2D patches that: (i) are contiguous with a 2D patch which is currently in the expanded set and (ii) satisfy the defined orientation similarity criterion and defined depth similarity criterion with respect to the 2D patch in the expanded set; and updating the expanded set by adding the one or more remaining 2D patches thereto.

15. The computing system of claim 12, wherein the at least one processing circuit is configured to include, in the initial set of one or more 2D patches, a 2D patch of the plurality of 2D patches that represents a smoothest location or group of locations among the plurality of locations that are represented by the image information.

16. The computing system of claim 15, wherein the at least one processing circuit is configured to determine a plurality of smoothness scores that indicate respective degrees of smoothness of across one or more object surfaces at respective locations represented by the image information, wherein the 2D patch included in the initial set of one or more 2D patches represents a location having a highest smoothness score among the plurality of smoothness scores.

17. A non-transitory computer-readable medium having instructions that, when executed by a processing circuit of a computing system, causes the processing circuit to:

receive image information by the processing circuit of the computing system, wherein the computing system is configured to communicate with: (i) a robot having an end effector apparatus, and (ii) a camera having a camera field of view, wherein the image information is for representing an object surface associated with a flexible object in the camera field of view, and is generated by the camera;

identify, as a grip region, a surface region of the object surface that satisfies a defined smoothness condition and has a region size that is larger than or equal to a defined region size threshold, wherein the grip region is identified based on the image information;

identify, as a safety region, a three-dimensional (3D) region indicative of a sag portion of the flexible object outside of the grip region in one or more horizontal dimensions, and which extends from the one or more horizontal dimensions along a vertical dimension that is perpendicular to the one or more horizontal dimensions;

perform robot motion planning based on the grip region and the safety region, wherein the robot motion planning is for:
gripping of the flexible object at the grip region by the end effector apparatus, and
avoiding other objects in an environment with the robot; and communicate commands to the robot to cause the robot to perform the planned motion.

18. The non-transitory computer-readable medium of claim 17, wherein the defined region size threshold is a defined contact region size associated with contact between the end effector apparatus and the flexible object, such that the grip region is large enough to fit a contact region having the defined contact region size.

19. The non-transitory computer-readable medium of claim 17, wherein the instructions, when executed by the processing circuit and when the flexible object is an object that sags upon being lifted, to cause the processing circuit to determine a safety region height based on a defined lateral dimension size associated with the flexible object.

20. A method performed by a computing system, the method comprising:
receiving image information by the computing system, wherein the computing system is configured to communicate with: (i) a robot having an end effector apparatus, and (ii) a camera having a camera field of view, wherein the image information is for representing an object surface associated with a flexible object in the camera field of view, and is generated by the camera;
identifying, as a grip region, a surface region of the object surface that satisfies a defined smoothness condition and has a region size that is larger than or equal to a defined region size threshold, wherein the grip region is identified based on the image information;
identifying, as a safety region, a three-dimensional (3D) region indicative of a sag portion of the flexible object outside of the grip region in one or more horizontal dimensions, and which extends from the one or more horizontal dimensions along a vertical dimension that is perpendicular to the one or more horizontal dimensions;
performing robot motion planning based on the grip region and the safety region, wherein the robot motion planning is for:
gripping of the flexible object at the grip region by the end effector apparatus, and
avoiding other objects in an environment with the robot; and
communicating commands to the robot to cause the robot to perform the planned motion.

* * * * *